US012760548B1

(12) United States Patent
Sarkisian et al.

(10) Patent No.: US 12,760,548 B1
(45) Date of Patent: Oct. 13, 2026

(54) TECHNOLOGIES FOR A FUSE-BRACE FRAME

(71) Applicant: SOM IW HOLDINGS, LLC, New York, NY (US)

(72) Inventors: Mark Peter Sarkisian, New York, NY (US); Neville John Mathias, New York, NY (US); David Adam Shook, New York, NY (US)

(73) Assignee: SOM IW Holdings, LLC, New York, NY (US)

( * ) Notice: Subject to any disclaimer, the term of this patent is extended or adjusted under 35 U.S.C. 154(b) by 0 days.

(21) Appl. No.: 19/359,192

(22) Filed: Oct. 15, 2025

(51) Int. Cl.
*E04H 9/02* (2006.01)
*F16F 7/08* (2006.01)

(52) U.S. Cl.
CPC ............. *E04H 9/0237* (2020.05); *F16F 7/08* (2013.01); *F16F 2222/04* (2013.01); *F16F 2224/0208* (2013.01); *F16F 2224/0258* (2013.01); *F16F 2224/0291* (2013.01); *F16F 2236/103* (2013.01)

(58) Field of Classification Search
CPC ......... E04H 9/022; E04H 9/024; E04H 9/027; E04H 9/0237; F16F 7/08; F16F 7/085; F16F 7/087
USPC ......................................................... 52/167.3
See application file for complete search history.

(56) References Cited

U.S. PATENT DOCUMENTS 2,106,084 A * 1/1938 Coddington .............. E04C 3/08 52/655.1
5,347,771 A * 9/1994 Kobori .................. E04H 9/0235 188/312
5,375,382 A * 12/1994 Weidlinger ............... E04B 1/98 52/167.3
5,491,938 A * 2/1996 Niwa .................... E04H 9/0237 52/167.3
5,842,312 A * 12/1998 Krumme ................... F16F 1/46 248/634
5,870,863 A * 2/1999 Taylor ................... E04H 9/0237 52/167.3
5,934,028 A * 8/1999 Taylor ................... E04H 9/0235 403/171
5,946,866 A * 9/1999 Weglewski ............... F16F 1/40 52/167.7

(Continued)

FOREIGN PATENT DOCUMENTS

CN 2597576 Y 1/2004
CN 201713959 U 1/2011

(Continued)

OTHER PUBLICATIONS

Canxing Qiu, et al., "Seismic performance evaluation of multi-story CBFs equipped with SMA-friction damping braces", Journal of Intelligent Material Systems and Structures, 2021, vol. 32 (15), pp. 1725-1743.

(Continued)

*Primary Examiner* — James M Ference
(74) *Attorney, Agent, or Firm* — Dentons US LLP

(57) ABSTRACT

A structural fuse-brace with a joint assembly may be incorporated into the frame of a building or other structure subject to seismic activity or extreme winds to protect the structure from damage. The joint assembly includes elastic members that are placed under tension when plates of a plate assembly are displaced. This tension biases the plates to return to their original positions.

20 Claims, 18 Drawing Sheets

(56) References Cited

U.S. PATENT DOCUMENTS

| | | | | | |
|---|---|---|---|---|---|
| 6,141,919 | A * | 11/2000 | Robinson | F16F 7/08 52/573.1 |
| 6,681,538 | B1 * | 1/2004 | Sarkisian | E04C 3/06 52/289 |
| 8,763,320 | B1 * | 7/2014 | Chou | E04H 12/16 52/167.3 |
| 9,683,365 | B2 * | 6/2017 | Haque | E04C 3/02 |
| 10,995,511 | B2 * | 5/2021 | Zhang | E04H 9/024 |
| 10,995,571 | B2 * | 5/2021 | Zheng | E21B 3/02 |
| 11,072,938 | B2 * | 7/2021 | Pryor | E04H 9/024 |
| 11,313,145 | B2 * | 4/2022 | Noori | E04H 9/021 |
| 11,371,241 | B2 * | 6/2022 | Jiang | E04B 1/98 |
| 2001/0054785 | A1 * | 12/2001 | Berton | E04H 9/0237 267/136 |
| 2003/0180567 | A1 * | 9/2003 | Dunne | F03G 7/06143 148/402 |
| 2004/0074161 | A1 * | 4/2004 | Kasai | E04H 9/0237 52/167.3 |
| 2004/0190981 | A1 * | 9/2004 | Tsai | E04H 9/0237 403/293 |
| 2005/0005539 | A1 * | 1/2005 | Nakamura | E04H 9/0237 52/167.3 |
| 2005/0087414 | A1 * | 4/2005 | Okimura | F16F 7/08 188/381 |
| 2006/0144006 | A1 * | 7/2006 | Suzuki | E04H 9/024 52/655.1 |
| 2008/0016794 | A1 * | 1/2008 | Tremblay | E04H 9/0237 52/167.4 |
| 2008/0289267 | A1 * | 11/2008 | Sarkisian | E04H 9/0237 52/167.3 |
| 2008/0307722 | A1 * | 12/2008 | Christopoulos | E04H 9/0237 52/167.3 |
| 2009/0293380 | A1 * | 12/2009 | Sasaki | E04H 9/0237 52/167.6 |
| 2010/0205876 | A1 * | 8/2010 | Christopoulus | E04H 9/024 52/698 |
| 2012/0138402 | A1 * | 6/2012 | Choi | F16F 7/08 188/381 |
| 2012/0266548 | A1 | 10/2012 | Tremblay et al. | |
| 2013/0152490 | A1 * | 6/2013 | Hinchman | E04H 9/0215 29/897.3 |
| 2013/0283709 | A1 * | 10/2013 | Christopoulos | E04B 1/98 188/376 |
| 2015/0159369 | A1 * | 6/2015 | Chen | E04B 1/2403 52/167.8 |
| 2015/0225972 | A1 * | 8/2015 | Tsai | E04C 3/00 52/848 |
| 2017/0067249 | A1 * | 3/2017 | Matteson | E04C 3/32 |
| 2017/0107734 | A1 * | 4/2017 | Gray | E04H 9/0237 |
| 2017/0276204 | A1 * | 9/2017 | Uno | F16F 1/406 |
| 2019/0186165 | A1 * | 6/2019 | Pall | E04B 1/92 |
| 2021/0310239 | A1 * | 10/2021 | Montgomery | F16F 1/50 |
| 2022/0333369 | A1 * | 10/2022 | Richards | E04B 1/2403 |
| 2022/0333397 | A1 * | 10/2022 | Richards | E04H 9/021 |
| 2023/0117355 | A1 * | 4/2023 | Robinson | E04H 9/0237 52/167.1 |
| 2023/0175248 | A1 * | 6/2023 | Richards | E04H 9/024 52/167.1 |
| 2023/0374811 | A1 * | 11/2023 | Ozbulut | E04H 9/0237 |
| 2024/0159074 | A1 * | 5/2024 | Tsampras | E04H 9/021 |
| 2024/0263478 | A1 * | 8/2024 | Sitler | E04H 9/02 |
| 2024/0318419 | A1 * | 9/2024 | Nunneley | E04B 1/2403 |

FOREIGN PATENT DOCUMENTS

| | | | |
|---|---|---|---|
| CN | 101654935 | B | 2/2011 |
| CN | 203891204 | U | 10/2014 |
| CN | 104631626 | A | 5/2015 |
| CN | 204626245 | U | 9/2015 |
| CN | 205134537 | U | 4/2016 |
| CN | 106592804 | A | 4/2017 |
| CN | 106639459 | A | 5/2017 |
| CN | 105256895 | B | 6/2017 |
| CN | 206273922 | A | 6/2017 |
| CN | 206385445 | U | 8/2017 |
| CN | 206477461 | U | 9/2017 |
| CN | 106592413 | B | 2/2018 |
| CN | 107313643 | B | 3/2018 |
| CN | 105672493 | B | 6/2018 |
| CN | 108487471 | A | 9/2018 |
| CN | 107795176 | B | 10/2019 |
| CN | 110374222 | A | 10/2019 |
| CN | 110374223 | A | 10/2019 |
| CN | 108060725 | B | 11/2019 |
| CN | 110685484 | A | 1/2020 |
| CN | 109267666 | B | 3/2020 |
| CN | 109267667 | B | 6/2020 |
| CN | 211007128 | U | 7/2020 |
| CN | 1096533995 | B | 7/2020 |
| CN | 109281416 | B | 9/2020 |
| CN | 112854541 | A | 5/2021 |
| CN | 214941324 | U | 11/2021 |
| CN | 216564383 | U | 5/2022 |
| CN | 216740173 | U | 6/2022 |
| CN | 113356383 | B | 8/2022 |
| CN | 117211430 | A | 12/2023 |
| CN | 117926934 | A | 4/2024 |
| EP | 1016765 | A2 | 12/1999 |
| JP | 2002-155640 | | 5/2002 |
| JP | 6629923 | B2 | 1/2020 |

OTHER PUBLICATIONS

Qin Xie et al., "Experimental investigation of the hysteretic performance of self-centering buckling-restrained braces with friction fuses", Engineering Structures, vol. 203, Jan. 15, 2020, https://doi.or/10,1016/j.engstruct.2019.109865.

Kezia Varughese, et al., "Design and behaviour of stell braced frame reinforced with NiTi SMA wires", Engineering Structures, vol. 212, Jun. 1, 2020, https://doi.org/10,1016/j.engstruct.2020.110502.

Osman Ozbulut, et al., "GA-based optimum design of a shape memory alloy device for seismic response mitigation", Smart Mater. Struct., vol. 19, 2010, 14 pages; doi:10.1088/0964-1726/19/6/065004l.

Fei Shi, et al., "Development and Experimental Validation of Anchorage Systems for shape memory alloy cables", Engineering Structures, vol. 228, 2021, 13 pages; https://doi.org/10.1016/j.engstruct.2020.111611.

C. Fang et al.., Shape Memory Alloys for Seismic: Resilence, 2020, 54 pages, https//doi.org/10-1007/978-981-13-7040-3_2.

Fein Shi, et al., "Hysteretic Response and Failure Behavior of an SMA cable-based self-centering brace", Struct. Control Health Monit., 2021, 22 pages; https://doi.or/10.1002/sic.2847.

Wen-Shao Chang, et al., "Use of shape-memory alloys in construction: a critical review", Civil Engineering, vol. 169, Issue CE2, May 2016, pp. 87-95; http://dx.doi.org/10.1680/jcien.15.00010.

Osman Ozbulut, et al., "Seismic Response Control Using Shape Memory Alloys: A Review", Journal of Intelligent Material Systems and Structures, vol. 22, Sep. 2011; pp. 1531-1549.

Jieyjin Sui, et al., "Study of a New Type SMA Damper", Advanced Materials Research, vols. 250-253, pp. 2897-2901, online May 17, 2011.

Ehsan Darvishan, "Seismic Retrofit of Vulnerable Steel Frames Using Articulated Quadrilateral bracing System", Numerical Methods in Civil Engineering, vol. 4, No. 2, Dec. 2019, 15 pages.

Matthew S. Speicher, et al., "Investigation of an articulated quadrilateral bracing system utilizing shape memory alloys", Journal of Constructional Steel Research, vol. 130, 2017, pp. 65-78.

* cited by examiner

SIDE VIEW
SMA CABLE FUSE BRACE
DEVICE COMPRESSION END

SIDE VIEW
SMA CABLE FUSE BRACE DEVICE
INNER PLATE
COMPRESSION END

TOP VIEW
SMA CABLE FUSE BRACE
DEVICE TENSION END

TECHNOLOGIES FOR A FUSE-BRACE FRAME

TECHNICAL FIELD

This disclosure relates to tension/compression frames for counteracting seismic or wind loads on structural frames.

BACKGROUND

Structures, e.g., buildings, have been constructed, and are being constructed daily, in areas subject to seismic activity and extreme wind events. Special considerations must be given to the design of such structures. These structures must be designed not only to accommodate normal loading or service conditions, but also those loading conditions that are unique to seismic activity or extreme winds. For example, frames are typically subjected to lateral cyclic motions during seismic and wind events. To withstand such loading conditions, structures subjected to seismic activity must behave with ductility to allow for the dissipation of energy under those extreme loads and in wind events designed to behave elastically while being dampened to limit occupant perception to motion. For most structures subjected to significant seismic loading, ductility is achieved through yielding of materials resulting in permanent damage through the component as well as system deformation.

In the past, most frames subject to seismic or wind loads have been designed with the beams and braces fully connected to columns either by welding or bolting or a combination of the two. Flanges of beams are typically connected to column flanges via full penetration, partial penetration or fillet welds. Beam webs may be either connected with full penetration welds or by bolting. Diagonal bracing members are typically connected to a joint that is welded to the beams and the columns. Diagonal braces are typically bolted to the joints. However, welding is also used.

Braced frames have been used in structures to resist lateral loads. In addition, the use of moment-resisting frames in taller structures may not be feasible since the required stiffness may only be achievable with large structural members that add to the amount of material required for the structure and therefore cost. Braced frames provide an efficient means of achieving the appropriate stiffness. However, braced frames provide questionable ductility when subjected to cyclic seismic loadings and provide insignificant damping in wind loading events. Since structural members used in diagonal configurations are typically subjected to primarily axial load with only minimal bending, material required to resist forces is usually minimum relative to the benefit for strength and stiffness.

Braced frames may be designed to have bracing members resist tension only or to resist both tension and compression. Since ductility is limited in these frames, building codes, specifically the International Building Code (IBC), have limitations to their use. Tension-only braced frames (diagonal members only capable of resisting tensile loads) for occupied structures are limited to a height as low as 35 feet since the lack of redundancy could lead to collapse and are not allowed for some soil conditions. In recognition of limited system ductility in design, the recommended R-Factor (Response Modification Factor) for such systems is 3.0, compared to 8.0 in a special moment-resisting frame. The higher the R-Factor, the higher the potential system ductility in a seismic event. The applied seismic forces for design can be reduced by this factor for final component and system structural member sizing. The R-Factor reduces the design seismic force and allows for a simpler linear analysis of the structure.

Furthermore, braced frames that resist both tension and compression provide questionable ductility when subjected to cyclic seismic loading. The braces in such frames typically buckle and in some cases fracture when subjected to further tension and compression loads. For instance, in accordance with building codes, specifically the International Building Code (IBC), braced frames capable of resisting both tension and compression are limited to a height as low as 35 feet for ordinary braced frames and 160 feet or 100 feet for special concentrically braced frames depending on soil conditions. In recognition of limited system ductility in design, the recommended R-Factor for ordinary braced frames is 5.6 and for special concentrically braced frames is 6.4 compared to 8.0 in a special moment-resisting frame. Eccentrically braced frames are designed to have the horizontal "linking" member inelastically deform during an extreme seismic event. The ductility for this type of frame is recognized by the IBC by recommending an R-Factor of 7.0. The permanent deformation of the links within these frames raises significant questions about the structure's ability to resist further seismic events without repair or replacement. Buckling Restraint Braced Frames (BRBFs) have an R-Factor of 8.0 but must be replaced after a significant seismic event.

Testing of braced frames, particularly steel concentric braced frames (CBF), indicates that many commonly used members and brace configurations do not meet seismic performance expectations. Net member section properties, section type, width-thickness ratio of the member cross section, and member slenderness impact the ductility of the braces. This has been shown, for example, through the research of Mahin and Uriz and documented in the "Seismic Performance Assessment of Concentrically Braced Steel Frames," proceedings of the 13th World Conference of Earthquake Engineering.

Considerable research has been performed on the performance of braced frames with the development of braced systems that allow for inelasticity to occur in a prescribed location. Such systems include BRBFs in which devices are inserted in the braces allowing for inelasticity to occur in localized areas, typically at the ends of the brace. After a severe seismic event, these devices protect the diagonal member from uncontrolled buckling. However, after a seismic event, these braces need to be removed and replaced to provide for future integrity of the structure. These braces do not provide any damping in major wind loading events since they are not designed to yield in such events.

Frames without diagonal braces provide ductility but with far less stiffness. Moment-resisting frame systems can be effective in resisting lateral loads when frames are designed for the appropriate loads and the connections are designed properly. In past seismic events, including the Northridge Earthquake in Northridge, California, moment-resisting frames within structures that used welded flange connections successfully prevented buildings from collapsing, but sustained considerable damage. After being subject to seismic loads, most of these types of moment-resisting frames have exhibited local failures of connections due to poor joint ductility. Such frames with these non-ductile joints have raised significant concerns about the structural integrity and the economic performance of currently employed moment-resisting frames after being subjected to an earthquake.

Frames designed to meet current building codes for life safety design typically sustain inelastic behavior of components and/or systems when subjected to significant seismicity, resulting in potential permanent displacement of the structure. The introduction of self-centering components and/or systems combined with minimal or no inelastic behavior is important to eliminate any permanent displacement.

Since the 1994 Northridge Earthquake, extensive research of beam-to-column moment connections has been performed to improve the ductility of the joints subject to seismic loading conditions. This research has led to the development of several modified joint connections, one of which is the reduced beam section connection ("RBS") or "Dogbone." Another is a slotted web connection ("SSDA"). While these modified joints have been successful in increasing the ductility of the structure, these modified joints must still behave inelastically to withstand extreme seismic loading. It is this inelasticity, however, that causes joint failure and, in many cases, causes the joint to sustain considerable damage. Although the amount of dissipated energy is increased by increasing the ductility, currently available joints still tend to become plastic or yield when subject to extreme seismic loading, because the joints still perform inelastically.

Although current frames may resist seismic events and prevent collapse, the damage caused by the members and the joints' inabilities to function elastically, raises questions about whether current structures can remain in service after enduring seismic events. A need therefore exists for frames that can withstand a seismic event without experiencing significant inelasticity or failure so that the integrity of the structure remains relatively undisturbed even after being subject to seismic activity.

SUMMARY

Disclosed herein is one or more inventions addressing problems of previous structural frame technology, including those described above. For example, some of those technologies enable a fuse-brace which provides an elastic structural response when exposed to seismic or wind loading and which can remain in service even after extreme seismic or wind loading. For instance, a fuse-brace may be incorporated into the frame of a building or other structure subject to seismic activity or extreme winds to protect the structure from damage and to improve the structure's dynamic characteristics by allowing a joint assembly of the fuse-brace to slip under extreme loads, such as from a seismic event or strong winds and recenter to its original at-rest position.

This disclosure recognizes that using high strength cables or shape memory alloy (SMA) in an appropriate configuration can act to recenter a structure. The introduction of SMA into the connection may result in superelastic behavior, dissipating energy through elongating or compressing the material resulting in pseudo elastic-plastic behavior where no permanent damage to the structure is experienced. The SMA material may also act to recenter the structure after a major seismic event. SMA is typically comprised of two or more materials. One SMA is a combination of nickel and titanium (otherwise known as nitinol). Other material combinations that act as SMAs include copper-zinc-aluminum and iron-manganese-silicon-chromium-nickel. SMAs are produced and available as rods or wires/cables. Historically, SMAs have been used for arterial stints and other medical devices. Some SMA materials require external heat to activate, but nitinol does not require heat for the material to deform and return to its original shape. This disclosure recognizes that the use of SMA in braced frames designed to resist wind loads allows joints that may fuse or slip through bolted friction joints to recenter to their original at-rest position after the wind event. Damping of the structure is achieved through movement of clamped friction joints, and recentering is achieved through the superelastic behavior of the SMA.

Fuse-braces may be configured with one combined device that resists tension and compression or two devices, where one resists tension and the other resists compression. A single tension device or a single compression device may also be used. Fuse material may include steel plates, friction material, high strength bolts, high strength steel cables or rods, SMA cables or rods, and the like.

In one aspect, the present disclosure provides a joint assembly comprising: a plate assembly comprising a first plate, a second plate, and a third plate all oriented parallel to each other with the third plate positioned between the first plate and the second plate; a fuse assembly comprising (a) at least one circular hole in the third plate, (b) a respective slot in each of the first plate and the second plate which respective slot is aligned with the at least one hole, each slot having a longitudinal extent parallel to a longitudinal extent of the third plate, and (c) a bolt extending through the respective slots and the at least one hole, the bolt being torqued to clamp together the first plate, the second plate, and the third plate; a first end plate to which the first plate and the second plate are secured and from which they extend, the first end plate positioned at a first end of the joint assembly; a second end plate to which the third plate is secured and from which it extends, the second end plate positioned at a second end of the joint assembly spaced from the first end of the joint assembly along a longitudinal direction of the third plate; and a restorative assembly comprising elastic members that are placed under tension when the first plate, second plate, and third plate are displaced along the longitudinal extent of the third plate with respect to their original relative positions to bias the first plate, the second plate, and the third plate to return to their original positions.

In some embodiments, the fuse assembly includes friction shims between the first plate and the third plate and between the second plate and the third plate.

In some embodiments, the restorative assembly includes a first connection plate and a second connection plate, the first connection plate having a first slot through which the first plate extends and a second slot through which the second plate extends, the second connection plate having a third slot through which the third plate extends.

In some embodiments, the elastic members extend through the first connection plate and the second connection plate and have stoppers to prevent the elastic members from pulling out of the first connection plate and the second connection plate.

In some embodiments, the elastic members extend through the first end plate and the second end plate and include second stoppers to prevent the elastic members from pulling out of the first end plate and the second end plate.

In some embodiments, the elastic members comprise cables, rods, or springs.

In some embodiments, the elastic members comprise a shape memory alloy (SMA).

In some embodiments, the elastic members comprise a superelastic material.

In some embodiments, the first end plate is connected to a diagonal brace member, the diagonal brace member comprising a pipe, a beam, a column or a brace.

In some embodiments, the friction shims comprise brass, steel, Teflon, bronze or a synthetic non-metallic material.

In some embodiments, the plate assembly is made of steel.

In some embodiments, the plate assembly is made of composite material.

In some embodiments, the second end plate is connected to a clevis connector.

In another aspect, the present disclosure is directed to a structural frame comprising a diagonal brace, the diagonal brace comprising a diagonal brace member, an end connector, and a joint assembly (such as one described above) configured to couple the diagonal brace member to the end connector, the joint assembly comprising: a plate assembly comprising a first plate, a second plate, and a third plate all oriented parallel to each other with the third plate positioned between the first plate and the second plate; a fuse assembly comprising (a) at least one hole in the third plate, (b) a respective slot in each of the first plate and the second plate which respective slot is aligned with the at least one hole, each slot having a longitudinal extent parallel to a longitudinal extent of the third plate, and (c) a bolt extending through the respective slots and the at least one hole, the bolt being torqued to clamp together the first plate, the second plate, and the third plate; a first end plate to which the first plate and the second plate are secured and from which they extend, the first end plate positioned at a first end of the joint assembly; a second end plate to which the third plate is secured and from which it extends, the second end plate positioned at a second end of the joint assembly spaced from the first end of the joint assembly along a longitudinal direction of the third plate; and a restorative assembly comprising elastic members that are placed under tension when the first plate, second plate, and third plate are displaced along the longitudinal extent of the third plate with respect to their original relative positions to bias the first plate, the second plate, and the third plate to return to their original positions.

In some embodiments, the fuse assembly includes friction shims between the first plate and the third plate and between the second plate and the third plate.

In some embodiments, the restorative assembly includes a first connection plate and a second connection plate, the first connection plate having a first slot through which the first plate extends and a second slot through which the second plate extends, the second connection plate having a third slot through which the third plate extends.

In some embodiments, the elastic members extend through the first connection plate and the second connection plate and have stoppers to prevent the elastic members from pulling out of the first connection plate and the second connection plate.

In some embodiments, the elastic members extend through the first end plate and the second end plate and include second stoppers to prevent the elastic members from pulling out of the first end plate and the second end plate.

In some embodiments, the elastic members comprise cables, rods, or springs. In some embodiments, the elastic members comprise a shape memory alloy (SMA).

DESCRIPTION OF DRAWINGS

FIG. 14A shows a diagram of a first portion of the joint assembly of FIG. 14C. FIG. 14B shows a diagram of a second portion of the joint assembly of FIG. 14C. FIG. 14C shows a diagram of an embodiment of a compression end joint assembly that can be used in the fuse-brace of FIG. 3.

FIG. 15A shows a diagram of a first portion of the tension end joint assembly of FIG. 15C. FIG. 15B shows a diagram of a second portion of the tension end joint assembly of FIG. 15C. FIG. 15C shows a diagram of a tension end joint assembly that can be used in the fuse-brace of FIG. 3.

DETAILED DESCRIPTION

Figure 1:
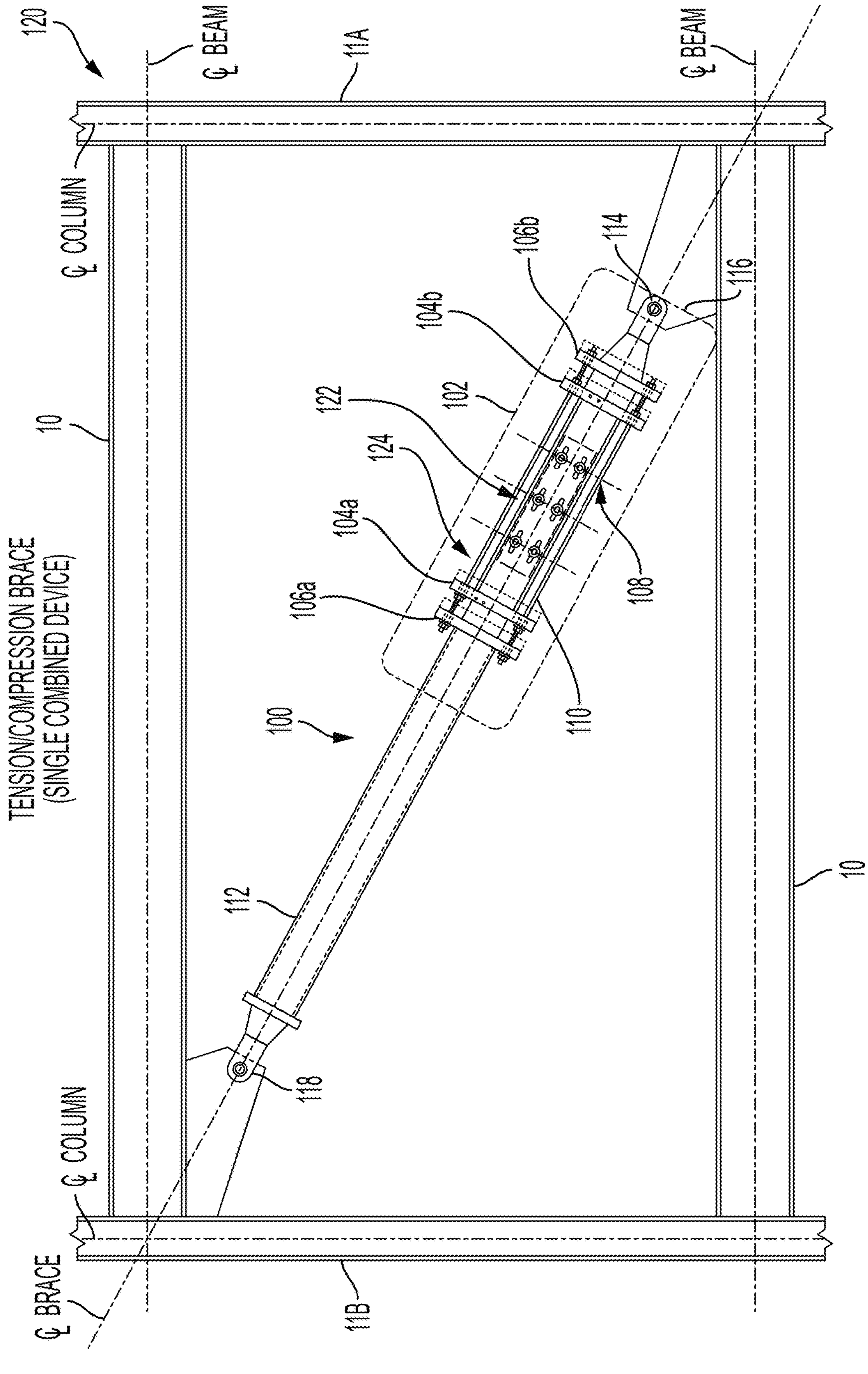
FIG. 1 shows a diagram of an embodiment of a fuse-brace capable of resisting both tension and compression installed in a frame assembly with a single device, according to embodiments of this disclosure.

This disclosure is now described more fully with reference to the drawings, in which some embodiments of this disclosure are shown. This disclosure may, however, be embodied in many different forms and should not be construed as necessarily being limited to the embodiments disclosed herein. Rather, these embodiments are provided so that this disclosure is thorough and complete, and fully conveys various concepts of this disclosure to skilled artisans.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

As used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of the present disclosure. As used herein, the singular forms "a," "an" and "the" are intended to include the plural forms (e.g., two, three, four, five, six, seven, eight, nine, ten, tens) as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

FIG. 1 shows a schematic diagram of an embodiment of a structural frame or frame assembly 120 with a fuse-brace 100 of this disclosure. The frame assembly 120 with fuse-brace 100 may be incorporated into the frame of a building or other structure subject to seismic activity or extreme winds to protect the structure from damage and to improve the structure's dynamic characteristics by allowing a joint assembly 102 of the fuse-brace 100 to slip under extreme loads. This slippage changes the structure's dynamic characteristics by lengthening the structure's fundamental period and essentially softening the structure, allowing the structure to exhibit elastic properties even during extreme seismic events. The fuse-brace 100 may be designed to allow for multiple "fuses" to occur within the frame's structure. For example, the diagonal fuse-brace 100 within the frame assembly 120 may be designed to slip at a predefined force level associated with a seismic event or high-wind event. When exposed to smaller forces, the joint assembly 102 may not slip. However, as force levels increase, the joint assembly 102 and the corresponding end of the fuse-brace 100 will slip and/or rotate. In a similar manner, individual or multiple diagonal members may be designed to slip, dissipating energy during an extreme wind event, providing damping and lessening overall demand on the structure. As such, the frame assembly 120 with fuse-brace 100 may lengthen dynamic periods and effectively reduce the forces that must be resisted within the frame assembly 120, so that the frame assembly 120 can withstand seismic activity without sustaining considerable or any damage. Because of these and other properties, the frame assembly 120 with fuse-brace 100 helps to protect the columns 11A,B of the structure from inelastic deformations or collapse.

The fuse-brace 100 includes a joint assembly 102, which acts as a sliding friction connection and helps to dissipate energy without damage during a seismic or extreme wind event. The fuse-brace 100 may also recenter the structure after the loading event has ended. The frame assembly 120 with fuse-brace 100 resists bending moments and shears generated by such loads. The frame assembly 120 with fuse-brace 100 may displace/translate or rotate during extreme seismic loading while dissipating energy, creating ductility without permanently yielding connections or members, preventing damage, recentering, and allowing the frame assembly 120 to remain in service following an earthquake. The fuse-brace 100 may be designed to resist tension loads only, compression loads only, or both of tension and compression loads.

In the example of FIG. 1, the fuse-brace 100 is employed as a diagonal brace in a structural frame assembly 120. However, this disclosure contemplates the fuse-brace 100 being employed as other structural components as appropriate for a given need. For example, the fuse-brace 100 may be employed as a beam, a column, or a brace. In the example of FIG. 1, the fuse-brace 100 extends between columns 11A,B and beams 10 of the frame assembly 120 and helps stabilize the frame assembly 120, for example, during seismic loading and/or extreme wind loading.

The frame assembly 120 may be a beam and column frame assembly which includes beams 10, columns 11A,B, and associated joints/connections. The frame assembly 120 may form a portion of a structure, such as a building. The frame assembly 120 with fuse-brace 100 may be located in structural areas of the building or other structure having the highest demand (e.g., that are most susceptible to damage under seismic or wind loading). The frame assembly 120 may be made of or include structural steel, reinforced concrete, timber, composite materials (e.g., a combination of structural steel and reinforced concrete or other materials), and/or other materials that can resist applied loads.

In the example of FIG. 1, the frame assembly 120 includes a single diagonal fuse-brace 100. However, the frame assembly 120 may have additional fuse-braces 100. For instance, the frame assembly 120 may have one, two, or more diagonal fuse-braces 100. As an example, two diagonal fuse-braces 100 may be configured to form an x-brace or to form a chevron brace. As another example, multiple diagonal fuse-braces 100 may be included to stiffen the frame assembly 120. The fuse-brace(s) 100 may be sloped in any appropriate direction and at any appropriate angle.

The fuse-brace 100 includes at least one joint assembly 102 at the end or along the length of the fuse-brace 100. In the example of FIG. 1, the joint assembly 102 connects a diagonal brace member 112 at a first end of the fuse-brace 100 to an end connector 114 at the opposite end of the fuse-brace 100. In other embodiments, the joint assembly 102 may be positioned at a different position along the length of the fuse-brace 100 (e.g., near the center or end of the diagonal brace member 112). The diagonal brace member 112 may be connected (e.g., welded, bolted, etc.) to a column 11A,B or beam 10 of the frame assembly 120 at position 118 (e.g., a joint of beams 10 and columns 11A, B of frame assembly 120). The diagonal brace member 112 may be a pipe, a beam, column, brace, or other structure. The diagonal brace member 112 may have any appropriate cross-sectional shape (e.g., round, square, rectangular, etc.). The diagonal brace member 112 may be made of or include structural steel, reinforced concrete, composite materials (e.g., a combination of structural steel and reinforced concrete or other materials), and/or other materials that can resist applied loads. The diagonal brace member 112 may be a steel pipe, which may be filled with concrete.

The end connector 114 is connected (e.g., welded, bolted, etc.) to a column 11A, B or beam 10 of the frame assembly 120 at position 116 (e.g., a joint of beams 10 and columns 11A,B of frame assembly 120). The end connector 114 may be a joint connector, such as a clevis connector, which provides connection via a pin or rod that aids in securing the end connector 114 to the frame assembly 120. While shown connected at positions 118 and 116, the diagonal brace member 112 and end connector 114 may instead be connected to different portions of the frame assembly 120 or another structure.

As described in greater detail below with the example embodiments of FIGS. 2A-E, the joint assembly 102 acts as a friction joint made up of plates, a friction material, and high strength bolts along with elastic members 110. The joint assembly 102 includes a plate assembly 108 with a first plate, a second plate, and a third plate all oriented parallel to each other (e.g., along a length of the joint assembly 102) with the third plate positioned between the first plate and the second plate (see, e.g., example joint assemblies of FIGS. 2A-E). The joint assembly 102 also includes a fuse assembly 122 with bolts (e.g., high-strength steel bolts) clamping the first, second, and third plates together. For example, as shown in the example embodiments of FIGS. 2A-E, the third plate may have at least one hole, while the first plate and the second plate each have a respective slot aligned with the at least one hole. A bolt extends through the respective slots and the at least one hole and is torqued to clamp together the first, second, and third plate.

The joint assembly 102 also includes a first end plate 106*a* to which the first plate and the second plate are secured and from which they extend and a second end plate 106*b* to which the third plate is secured and from which it extends (see, e.g., example joint assemblies of FIGS. 2A-E). The joint assembly 102 includes a restorative assembly 124 which includes elastic members 110. The elastic members 110 are placed under tension when the first, second, and third plate are displaced along the longitudinal extent of the third plate with respect to their original relative positions to bias the plates to return to their original positions (e.g., when exposed to a force from seismic or wind loading). As used in this disclosure and in the claims, the longitudinal extent of a given plate or other component refers to the dimension of the plate or component along its axis perpendicular to its major surfaces, which preferably are parallel to each other. Since various plates are described herein as parallel, the axes of the plates would be coincident along the longitudinal direction. Unless indicated otherwise, the longitudinal extent is measured along the axis of the joint assembly 102 (e.g., the axes of the diagonal brace member 112 and end connector 114). In some embodiments, the restorative assembly 124 also includes connection plates 104*a,b*, which help hold the elastic members 110 in place (see FIGS. 2A-E and corresponding description below).

The elastic members 110 may be cables, rods, springs, or another structure providing an elastic response to being deformed. In some embodiments, the elastic members 110 are made of a SMA. SMAs are metal alloy materials that can return to their original shape after being deformed, such as in response to being subject to tension or compression. Example SMAs include nitinol, a nickel-titanium alloy. Other examples include copper-based alloys, such as Cu—Al—Ni, and ferrous alloys, such as Fe—Pt alloys. For example, in some embodiments, the elastic members 110 are nickel/titanium alloy (nitinol) cables or rods. In some embodiments, the elastic members 110 are ferrous alloy (e.g., Fe—Pt) cables or rods. More generally, the elastic members 110 may be made of other superelastic materials. A superelastic material is a material that can reversibly deform to a large strain under stress and return to its original shape when the stress is removed. Using SMA elastic members 110 may improve the ability of the frame assembly 120 to recenter after extreme loadings. Using SMA or other superelastic elastic members 110 may allow smaller frame members to be used than are typically required for a similar sized structure to withstand an extreme seismic event, thereby reducing overall component sizes, material requirements, construction complexity, and/or associated building costs.

During seismic and/or wind loading, energy may be dissipated through friction in the joint assembly 102. For example, the bolted first, second, and third plates (in the diagonal direction of FIG. 1—see example joint assemblies of FIGS. 2A-E) allow for a diagonal movement or slip of the first and second plates relative to the third plate (e.g., either in tension or compression) when subjected to extreme seismic loads without a significant loss in the bolt clamping force. Movement of the plates may be further restricted by treating the faying (i.e., contacting) surfaces of the plate assembly 108 with a friction material (e.g., by providing a friction shim between adjacent plates). The friction developed from the clamping force within the plate assembly 108 with the friction material against the plate surfaces prevents the joint assembly 102 from slipping under most normal service loading conditions, such as those imposed by gravity and moderate seismic and wind events. However, under extreme seismic and/or wind loading conditions, the level of force applied to the joint assembly 102 exceeds the product of the coefficient of friction times the normal bolt clamping force, which causes the joint assembly 102 to slip along its length and/or rotate while maintaining connectivity.

During this slip, the elastic members 110 are activated to bring the plate assembly 108 back to its original position. The elastic members 110 dissipate energy while also creating a mechanism for frame recentering after the seismic or wind event. For example, the sliding of the joint assembly 102 in the diagonal direction of FIG. 1 and/or the rotation of the joint assembly 102 during seismic events provides for the transfer of shear forces and bending moment from the diagonals and beams of the frame assembly 120 to its columns 11A,B. This sliding and rotation dissipates energy, which is also known as "fusing." This energy dissipation reduces or eliminates potential damage to the frame assembly 120 due to seismic or wind activity. Because of the unique properties of the joint assembly 102, the frame assembly 120 may also be resistant to subsequent earthquakes, since the joint assembly 102 and neighboring structures remain elastic without permanent deformation. As such, the frame assembly 120 with fuse-brace 100 can resist axial forces, bending moments, and shears generated by these loads.

As described above and further illustrated with respect to FIGS. 2A-E, although the joint assembly 102 of the present disclosure will slip under extreme seismic and wind loads to dissipate energy, the joints also remain elastic due to their construction. Furthermore, in some embodiments, no part of the joint assembly becomes plastic or yields when subjected to loading and during the subsequent slip or movement of the joint assembly's plates. This allows a frame assembly 120 with the fuse-brace 100 having a joint assembly 102 to remain in service after enduring a seismic event and still resist further seismic activity.

Figure 2A:
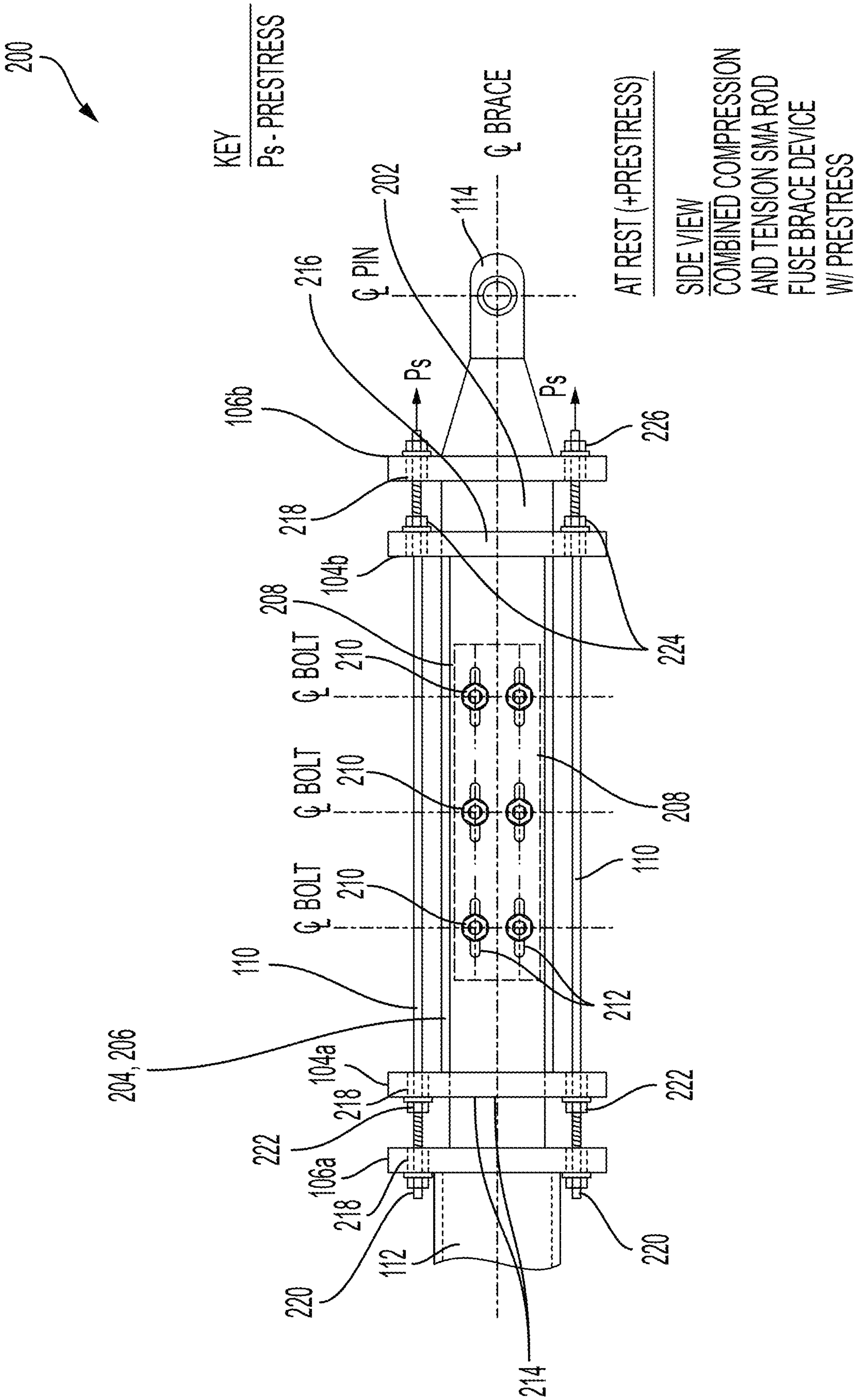
FIG. 2A shows a diagram of an embodiment of a joint assembly from a first view that can be used in the fuse-brace of FIG. 1.
Figure 2B:
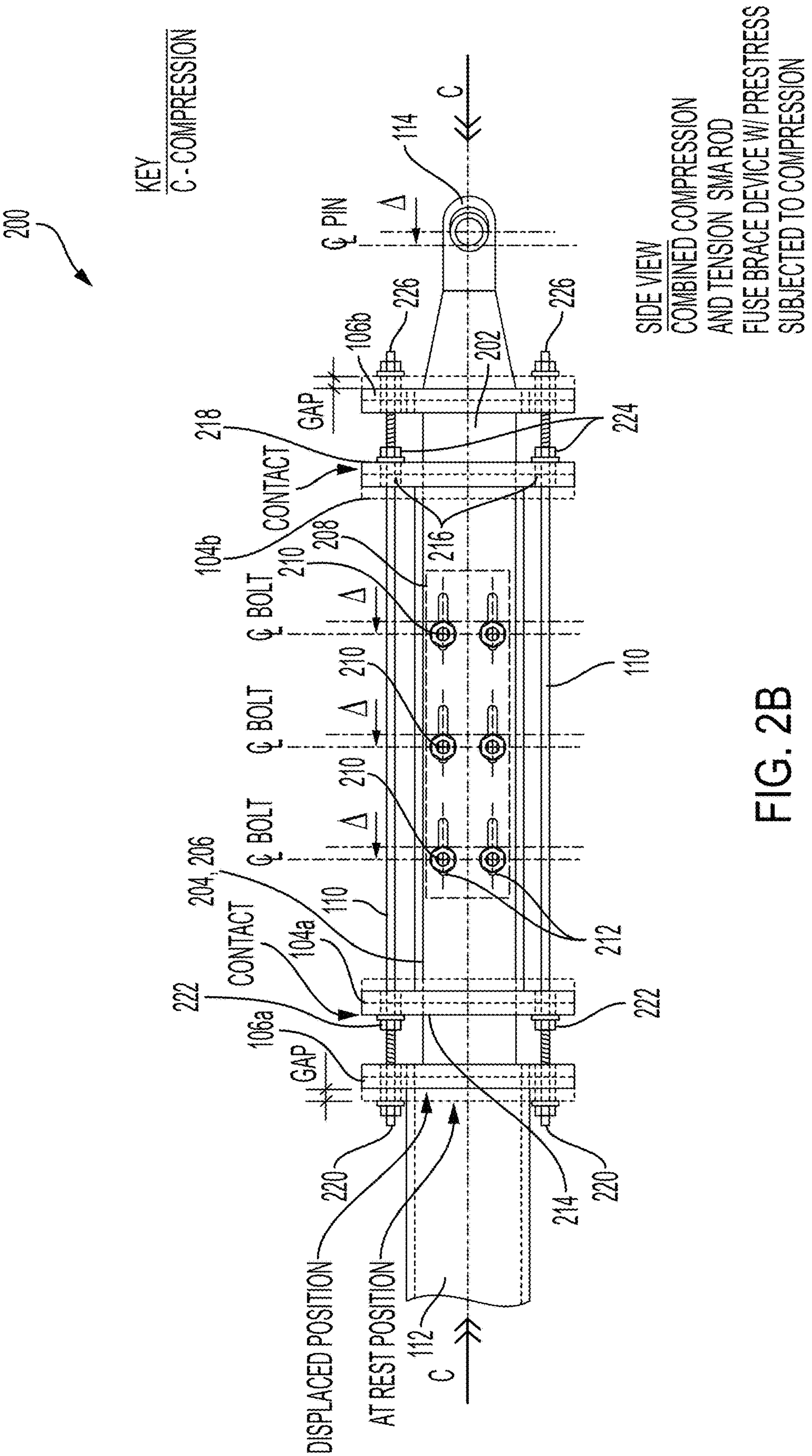
FIG. 2B shows a diagram of the joint assembly of FIG. 2A under compression.
Figure 2C:
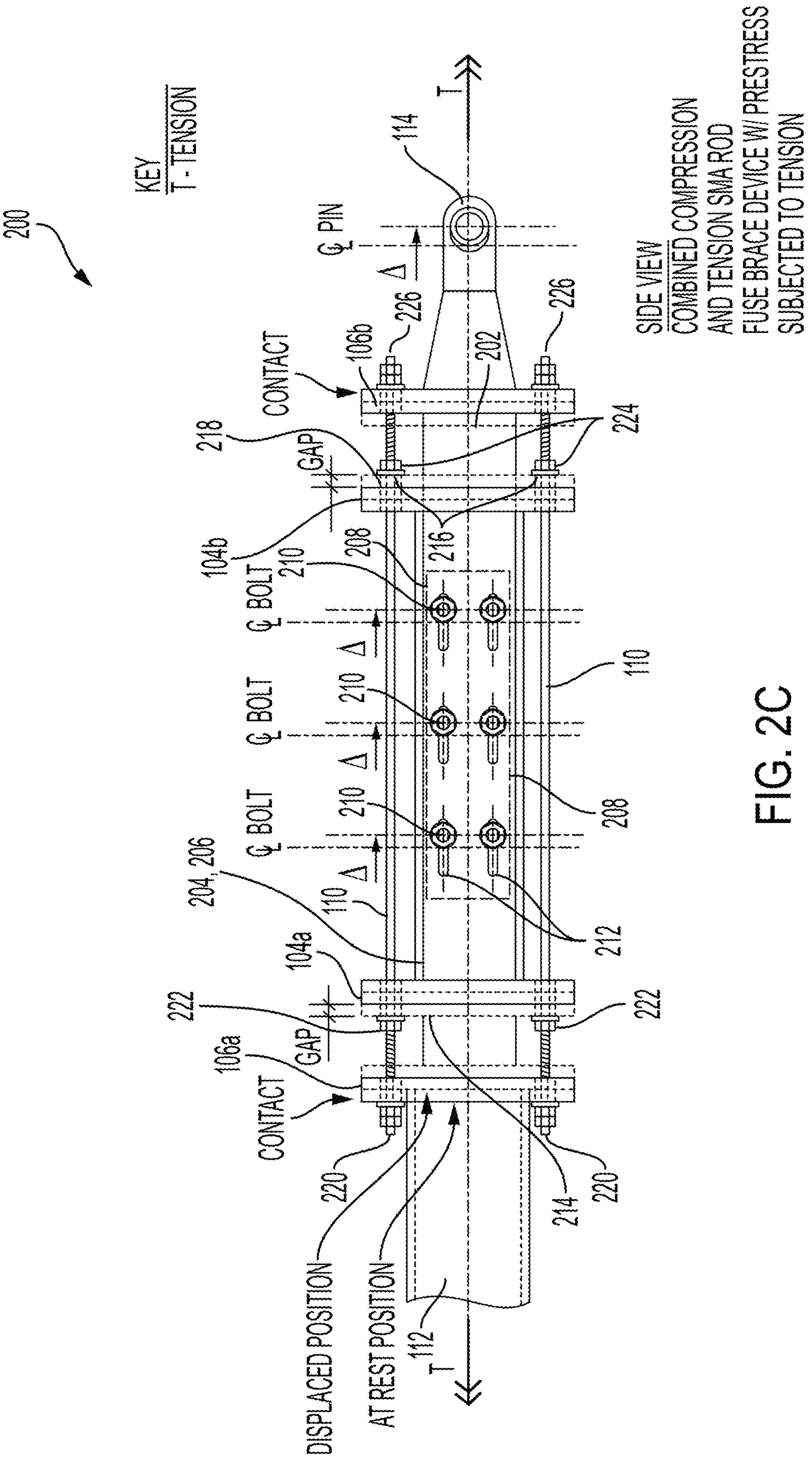
FIG. 2C shows a diagram of the joint assembly of FIG. 2A under tension.
Figure 2E:
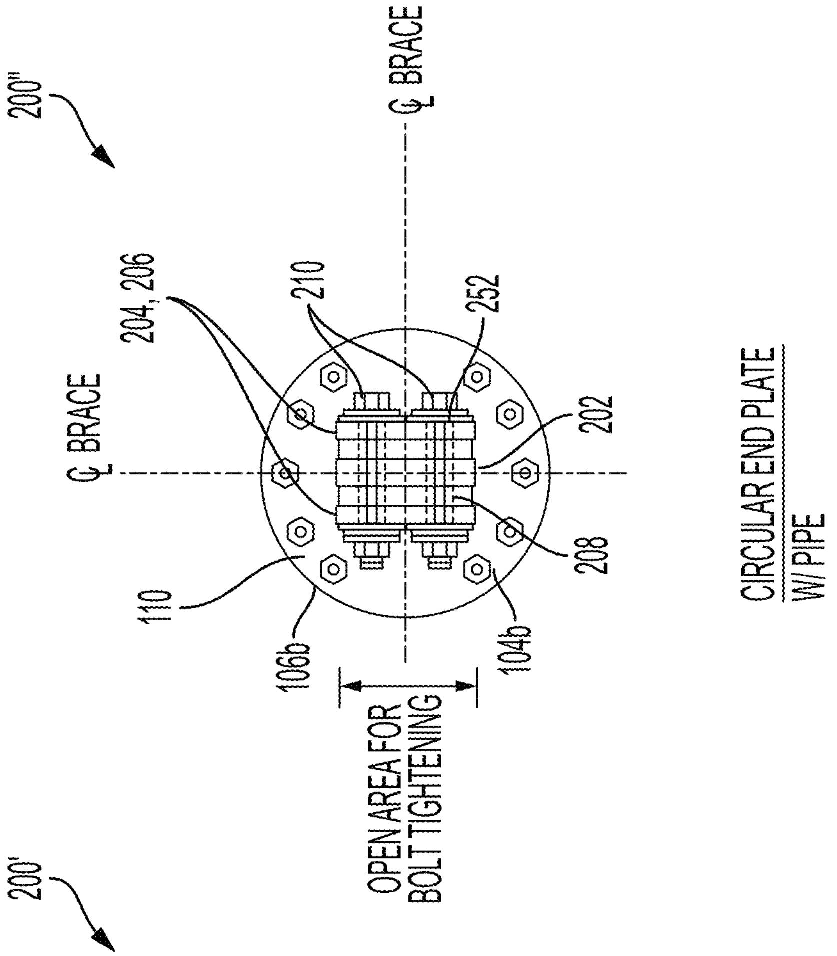
FIG. 2E shows a diagram of the joint assembly of FIG. 2A with a round end plate from a third view down a longitudinal extent of the joint assembly.
Figure 2D:
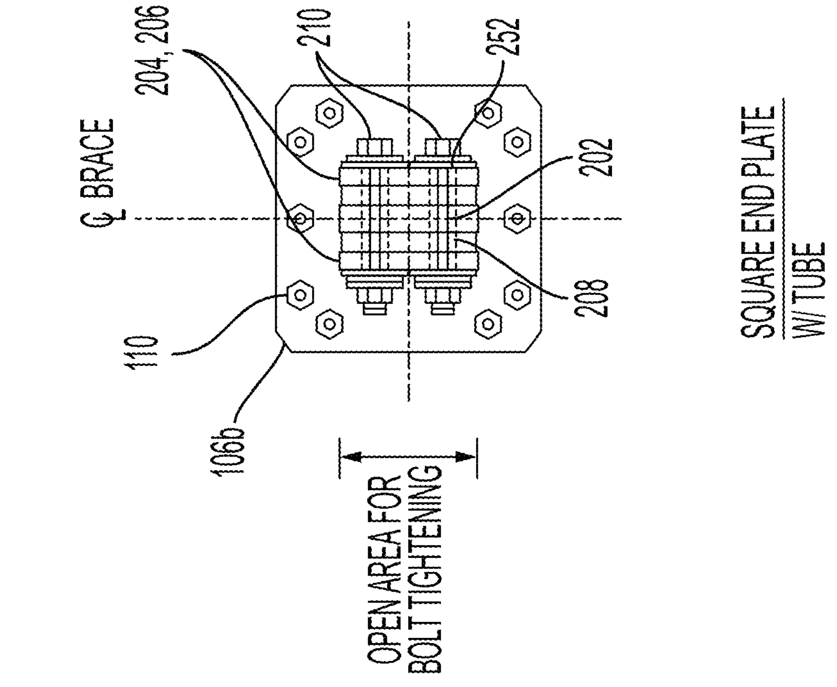
FIG. 2D shows a diagram of the joint assembly of FIG. 2A with an approximately square end plate from a third view down a longitudinal extent of the joint assembly.
Figure 2F:
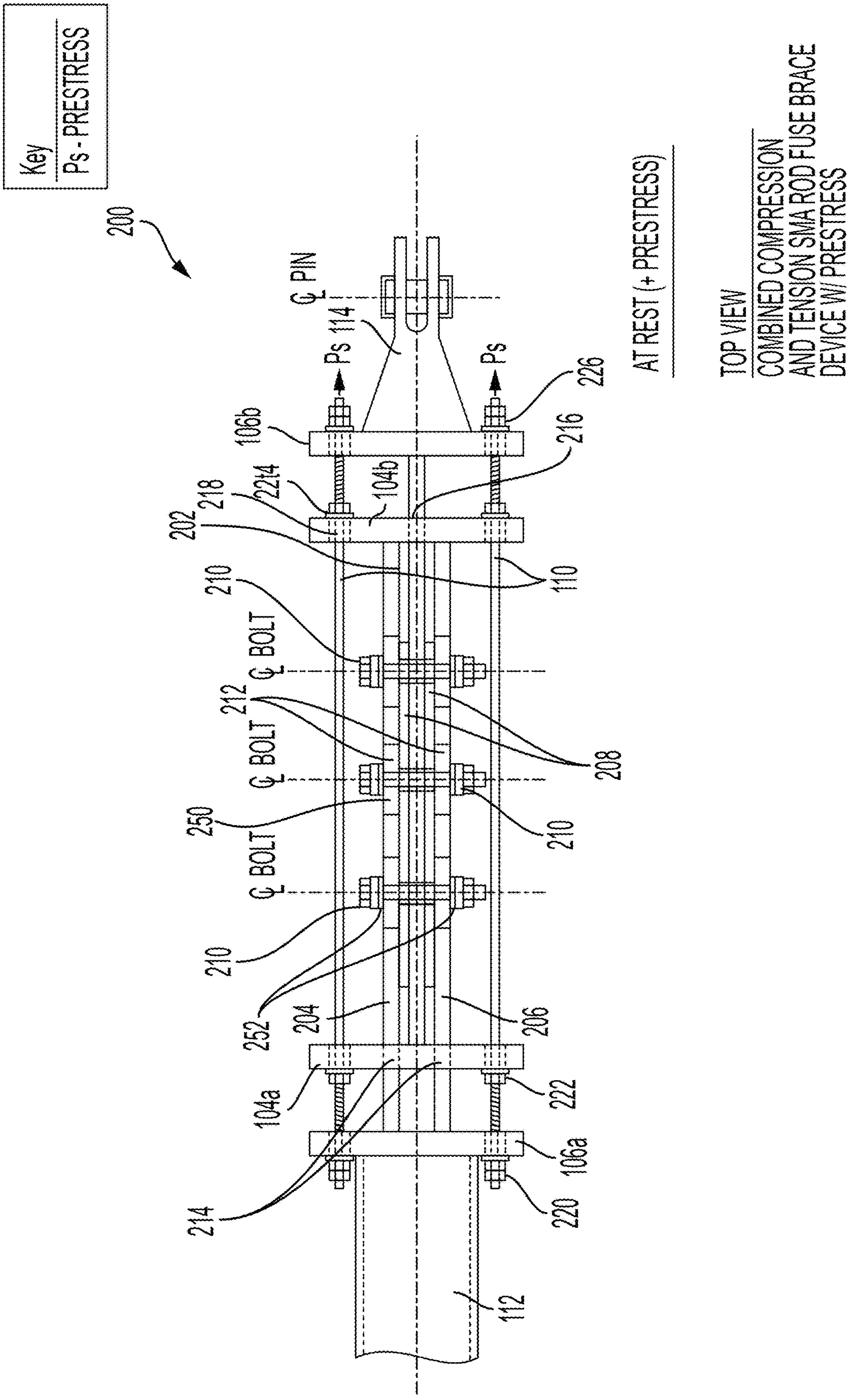
FIG. 2F shows a diagram of the joint assembly of FIG. 2A from a second view.

FIGS. 2A-E illustrate an embodiment of a joint assembly 200 which may be used as the joint assembly 102 of FIG. 1. FIGS. 2A-2C show a first or side view of the joint assembly 200. FIG. 2A shows the joint assembly 200 installed in a pre-stressed condition while at rest, while FIGS. 2B and 2C show the joint assembly 200 under compression and tension, respectively. In FIGS. 2B and 2C, the positions of the plates 104*a,b* and 106*a,b* at rest before the joint assembly is put under compression and tension, respectively are indicated by dashed or broken lines. FIGS. 2D and 2E show views of embodiments of joint assemblies 200' and 200" with the end plates 106*a,b* having different shapes (square for joint assembly 200' of FIG. 2D and round for joint assembly 200" of FIG. 2E) from a perspective directed down the longitudinal extent or length of the joint assembly 200. FIG. 2F shows the joint assembly 200 from a second or top view.

As shown in these figures, the joint assembly 200 includes a plate assembly (e.g., corresponding to plate assembly 108 of FIG. 1) that includes a first plate 204, a second plate 206, and a third plate 202 all oriented parallel to each other. The third plate 202 is positioned between the first plate 204 and the second plate 206 (see view of FIG. 2F). The first plate 204, second plate 206, and third plate 202 may be made of steel or a composite material.

The joint assembly 200 includes a fuse assembly (e.g., corresponding to fuse assembly 122 of FIG. 1) which includes holes 250 (see FIG. 2F) in the third plate 202 and respective slots 212 in each of the first plate 204 and the second plate 206. Each of the slots 212 is aligned with a corresponding hole 250. Each slot 212 has a longitudinal extent or length parallel to the longitudinal extent of the third plate 202. The longitudinal extent of each slot 212 is wider than the shank of its corresponding bolt 210 (see FIGS. 2A-2C). A bolt 210 extends through each hole 250 and its respective slots 212. The bolts 210 are torqued to clamp together the first plate 204, the second plate 206, and the third plate 202. The level of torque may be selected to allow the joint assembly 200 to slip, as shown in the examples of FIGS. 2B and 2C (described below), when exposed to extreme seismic or wind loading but to remain in place under normal loading conditions. The bolts 210 may be high-strength structural bolts.

The fuse assembly may include friction shims 208 between the first plate 204 and the third plate 202 and between the second plate 206 and the third plate 202. The friction shims 208 may include an abrasion resistant steel or a synthetic brake pad material. The friction shims 208 may include or be made of brass, steel, Teflon, bronze, or a synthetic non-metallic material, such as a phenolic resin or polytetrafluoroethylene (PTFE). The friction shims 208 may be made of a composite or hardened steel material (e.g., that is resistant to long-term cold-welding effects between the plates 202, 204, 206. Friction shims 252 (see FIG. 2F) may also be positioned between the heads of bolts 210 and corresponding washers. Friction shims 252 may be positioned between the surface of the first plate 204 and the head of the bolts 210 and between the surface of the second plate 206 and washers holding bolts 210 in place (see FIG. 2F). The bolts 210 may alternatively be installed in the opposite direction in some embodiments. Friction shims 252 may be made of the same or a similar material to that of friction shims 208.

The joint assembly 200 includes the first end plate 106*a* to which the first plate 204 and the second plate 206 are secured (e.g., welded) and from which they extend (see top view of FIG. 2F). The first end plate 106*a* is positioned at a first end of the joint assembly 200. The first end plate 106*a* is connected (e.g., welded) to diagonal brace member 112. The joint assembly 200 also includes the second end plate 106*b* to which the third plate 202 is secured (e.g., welded) and from which it extends (see top view of FIG. 2F). The second end plate 106*b* is positioned at a second end of the joint assembly 200, which is spaced from the first end of the joint assembly 200 along a longitudinal direction of the third plate. The second end plate 106*b* is connected (e.g., welded) to the end connector 114.

The joint assembly 200 includes a restorative assembly (e.g., corresponding to the restorative assembly 124 of FIG. 1). The restorative assembly includes elastic members 110, which can be rods, cables, springs, or the like, as described above with respect to FIG. 1. As also described above with respect to FIG. 1, the elastic members 110 may include or be made of a SMA or another superelastic material.

The restorative assembly may further include the first connection plate 104*a* and second connection plate 104*b*. The first connection plate 104*a* has a slot 214 through which the first plate 204 extends and a slot 214 through which the second plate 204 extends. The second connection plate 104*b* has a third slot 216 through which the third plate 206 extends. The elastic members 110 may extend through the first connection plate 104*a* and the second connection plate 104*b* (e.g., through holes 218). Stoppers 222, 224 may be present to prevent the elastic members 110 from pulling out of the first connection plate 104*a* and the second connection plate 104*b*. The stoppers 222, 224 may be a piece of material, such as steel or a composite, which fits around the elastic members 110. The elastic members 110 may also extend through the first end plate 106*a* and the second end plate 106*b* (e.g., through holes 218) and include stoppers 220, 226 to prevent the elastic members 110 from pulling out of the first end plate 106*a* and the second end plate 106*b*. The stoppers 220, 226 may be screw-on or other fasteners (e.g., made of steel, a composite, or a similar material) that can be affixed to ends of the elastic members 110 as shown. As shown in FIGS. 2B and 2C, the elastic members 110 are placed under tension when the first plate 204, second plate 206, and third plate 202 are displaced along the longitudinal extent of the third plate 202 with respect to their original relative positions (shown by dashed lines). This tension biases the first plate 204, the second plate 206, and the third plate 202 to return to their original positions.

As shown in FIG. 2A, when the joint assembly 200 is assembled or installed in a frame (e.g., frame assembly 120 of FIG. 1), the joint assembly 200 may be pre-stressed (or pre-tensioned). Pre-stressing the joint assembly 200 enables the joint assembly 200 to automatically self-center by returning to its original configuration. For example, during seismic loading or wind loading, the joint assembly 200 may undergo compression (see FIG. 2B) or tension (see FIG. 2C). When the loading event has ended, the joint assembly 200 returns to its original configuration of FIG. 2A. In some embodiments, the first connection plate 104*a* and the second end plate 106*b* may act as an anchor point, such that these plates 104*a*, 106*b* do not move relative to the end connector 114. In other embodiments, different anchor points may be used to pre-stress the joint assembly 200. The force used for pre-stressing the joint assembly 200 may be greater than the friction force for the joint assembly 200 (e.g., whether this force is known, measured, or estimated).

FIG. 2B shows the joint assembly 200 under compression conditions. Under these conditions, the bolts 210 move a distance (A) towards the first end plate 106*a*. Meanwhile, the first end plate 106*a* moves away from the stoppers 220 (relative to the initial position shown by dashed lines), leaving a gap between the stoppers 220 and the first end plate 106*a*. The second end plate 106*b* similarly moves away from the stoppers 226 (relative to the initial position shown by dashed lines), leaving a gap between the stoppers 226 and the second end plate 106*b*. The first connection plate 104*a* moves toward stoppers 222 (relative to the initial position shown by dashed lines), thereby causing the first connection plate 104*a* to contact the stoppers 222. The second connection plate 104*b* similarly moves toward stoppers 224 (relative to the initial position shown by dashed lines), thereby causing the second connection plate 104*b* to contact the stoppers 224. When the compression is removed, the bolts 210, end plates 106*a,b*, and connection plates 104*a,b* return to the original positions shown by dashed lines.

FIG. 2C shows the joint assembly 200 under tension conditions. Under these conditions, the bolts 210 move a distance (A) away from the first end plate 106*a*. Meanwhile, the first end plate 106*a* moves toward the stoppers 220 (relative to the initial position shown by dashed lines), causing the first end plate 106*a* to contact the stoppers 220. The second end plate 106*b* similarly moves toward the stoppers 226 (relative to the initial position shown by dashed lines), causing the second end plate 106*b* to contact the stoppers 226. The first connection plate 104*a* moves way from stoppers 222 (relative to the initial position shown by dashed lines), leaving a gap between the first connection plate 104*a* and the stoppers 222. The second connection plate 104*b* similarly moves away from stoppers 224 (relative to the initial position shown by dashed lines), leaving a gap between the second connection plate 104*b* and the stoppers 224. When the tension is removed, the bolts 210, end plates 106*a,b*, and connection plates 104*a,b* return to the original positions shown by dashed lines.

Figure 3:
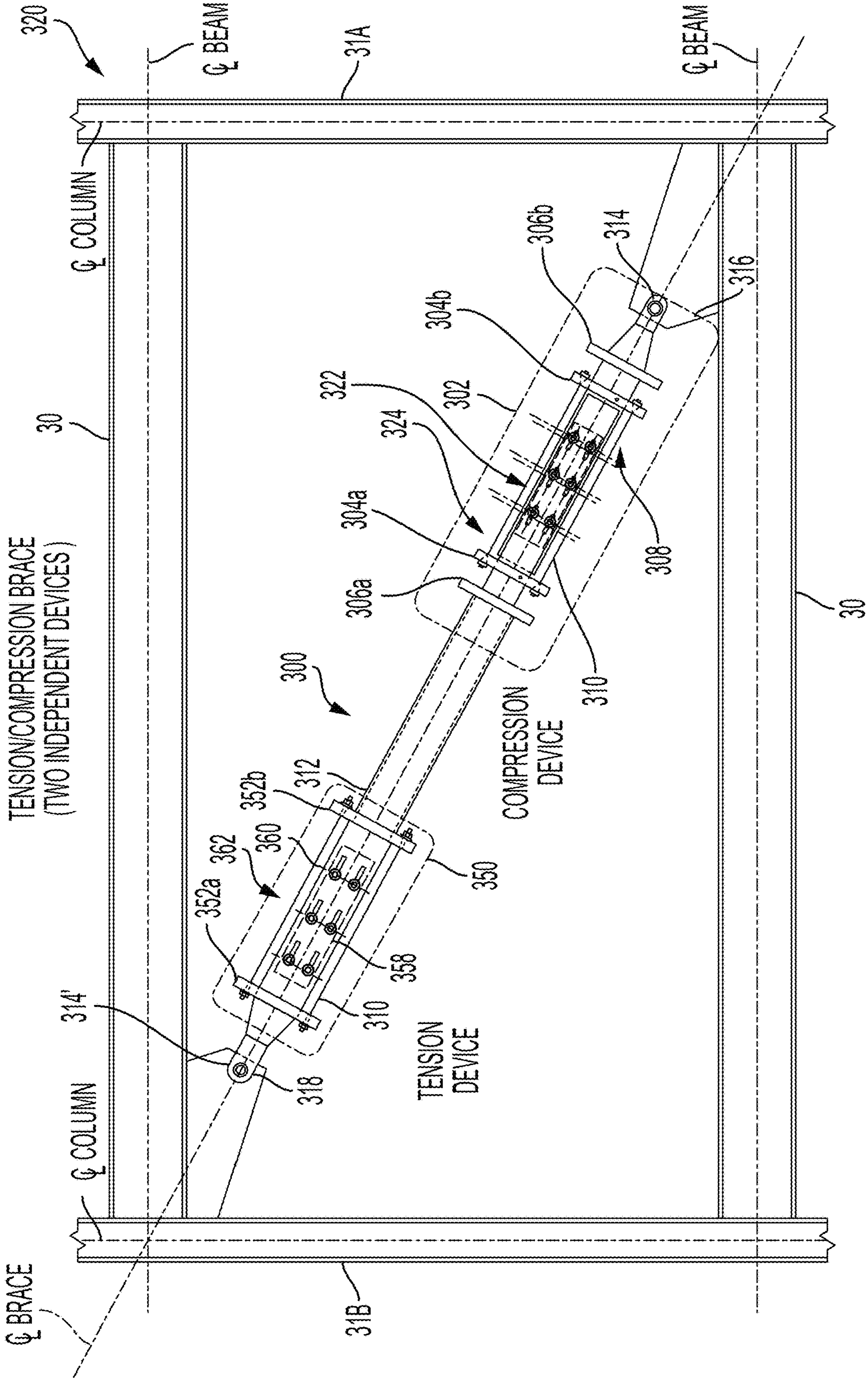
FIG. 3 shows a diagram of another embodiment of a fuse-brace capable of resisting both tension and compression installed in a frame assembly with two joint assemblies where one joint assembly resists tension and the other resists compression, according to embodiments of this disclosure.

FIG. 3 shows a schematic diagram of another embodiment of a structural frame or frame assembly 320 with another fuse-brace 300 of this disclosure. The frame assembly 320 with fuse-brace 300 may be incorporated into the frame of a building or other structure subject to seismic activity or extreme winds to protect the structure from damage and to improve the structure's dynamic characteristics by allowing joint assemblies 302 and 352 of the fuse-brace 300 to slip under extreme loads. This slippage changes the structure's dynamic characteristics by lengthening the structure's fundamental period and essentially softening the structure, allowing the structure to exhibit elastic properties even during extreme seismic events. The fuse-brace 300 may be designed to allow for multiple "fuses" to occur within the frame's structure. For example, the diagonal fuse-brace 300 within the frame assembly 320 may be designed to slip at a predefined force level associated with a seismic event or high-wind event. When exposed to smaller forces, the joint assembly 302 may not slip. However, as force levels increase, the joint assembly 302 and the corresponding end of the fuse-brace 300 will slip and/or rotate. In a similar manner, individual or multiple diagonal members may be designed to slip, dissipating energy during an extreme wind event, providing damping and lessening overall demand on the structure. As such, the frame assembly 320 with fuse-brace 300 may lengthen dynamic periods and effectively reduce the forces that must be resisted within the frame assembly 320, so that the frame assembly 320 can withstand seismic activity without sustaining considerable or any damage. Because of these and other properties, the frame assembly 320 with fuse-brace 300 helps to protect the columns 31A, B of the structure from inelastic deformations or collapse.

The example fuse-brace 300 includes a compression-resisting joint assembly 302 and a tension-resisting joint assembly 350, which act as a sliding friction connections and help to dissipate energy without damage during a seismic or extreme wind event. Unlike the fuse-brace 100 of FIG. 1, in the fuse-brace of FIG. 3, the compression-resisting joint assembly 302 provides resistance to compression during a stress even, while the separate tension-resisting joint assembly 350 provides resistance to tension. In embodiments, either the compression-resisting joint assembly 302 or tension-resisting joint assembly 350 may be absent, for example, if resistance to compression or tension is not needed for a certain application. The fuse-brace 300 may also recenter the structure after the loading event has ended. The frame assembly 320 with fuse-brace 300 resists bending moments and shears generated by such loads. The frame assembly 320 with fuse-brace 300 may displace/translate or rotate during extreme seismic loading while dissipating energy, creating ductility without permanently yielding connections or members, preventing damage, recentering, and allowing the frame assembly 320 to remain in service following an earthquake. The fuse-brace 300 may be designed to resist tension loads only via the tension-resisting joint assembly 350, compression loads only via the compression-resisting joint assembly 302, or both of tension and compression loads using both the tension-resisting joint assembly 350 and compression-resisting joint assembly 302.

In the example of FIG. 3, the fuse-brace 300 is employed as a diagonal brace in a structural frame assembly 320. However, this disclosure contemplates the fuse-brace 300 being employed as other structural components as appropriate for a given need. For example, the fuse-brace 300 may be employed as a beam, a column, or a brace. In the example of FIG. 3, the fuse-brace 300 extends between columns 31A,B and beams 30 of the frame assembly 320 and helps stabilize the frame assembly 320, for example, during seismic loading and/or extreme wind loading. The frame assembly 320 may be the same as or similar to the frame 120 of FIG. 1.

In the example of FIG. 3, the compression-resisting joint assembly 302 connects a diagonal brace member 312 (e.g., the same as or similar to brace member 112 of FIG. 1) at a first end of the fuse-brace 300 to an end connector 314 (e.g., the same as or similar to end connector 114 of FIG. 1) at the opposite end of the fuse-brace 300. In other embodiments, the compression-resisting joint assembly 302 may be positioned at a different position along the length of the fuse-brace 300 (e.g., nearer the center or other end of the diagonal brace member 312). The tension-resisting joint assembly 350 is coupled to another connector at the other end of the diagonal brace member 312 (opposite the end on which the compression-resisting joint assembly 302 is connected, as shown in FIG. 3). For example, the tension-resisting joint assembly 350 may be connected (e.g., welded, bolted, etc.) to a column 31A,B or beam 30 of the frame assembly 320 via an end connector 314' at position 318 (e.g., a joint of beams 30 and columns 31A,B of frame assembly 320). While shown connected at positions 318 and 316, the diagonal brace member 312 and end connector 314 may instead be connected to different portions of the frame assembly 320 or another structure.

As described in greater detail below with the example embodiments of FIGS. 4-7, 12-13, and 14A-C, the compression-resisting joint assembly 302 acts as a friction joint made up of plates, a friction material, and high strength bolts along with elastic members 310. The compression-resisting joint assembly 302 includes a plate assembly 308 with a first plate, a second plate, and a third plate all oriented parallel to each other (e.g., along a length of the compression-resisting joint assembly 302) with the third plate positioned between the first plate and the second plate (see, e.g., example joint assemblies of FIGS. 4 and 5). The compression-resisting joint assembly 302 also includes a fuse assembly 322 with bolts (e.g., high-strength steel bolts) clamping the first, second, and third plates together. For example, as shown in the example embodiments of FIGS. 4 and 5, the third plate may have at least one hole, while the first plate and the second plate each have a respective slot aligned with the at least one hole. A bolt extends through the respective slots and the at least one hole and is torqued to clamp together the first, second, and third plate.

Figure 4:
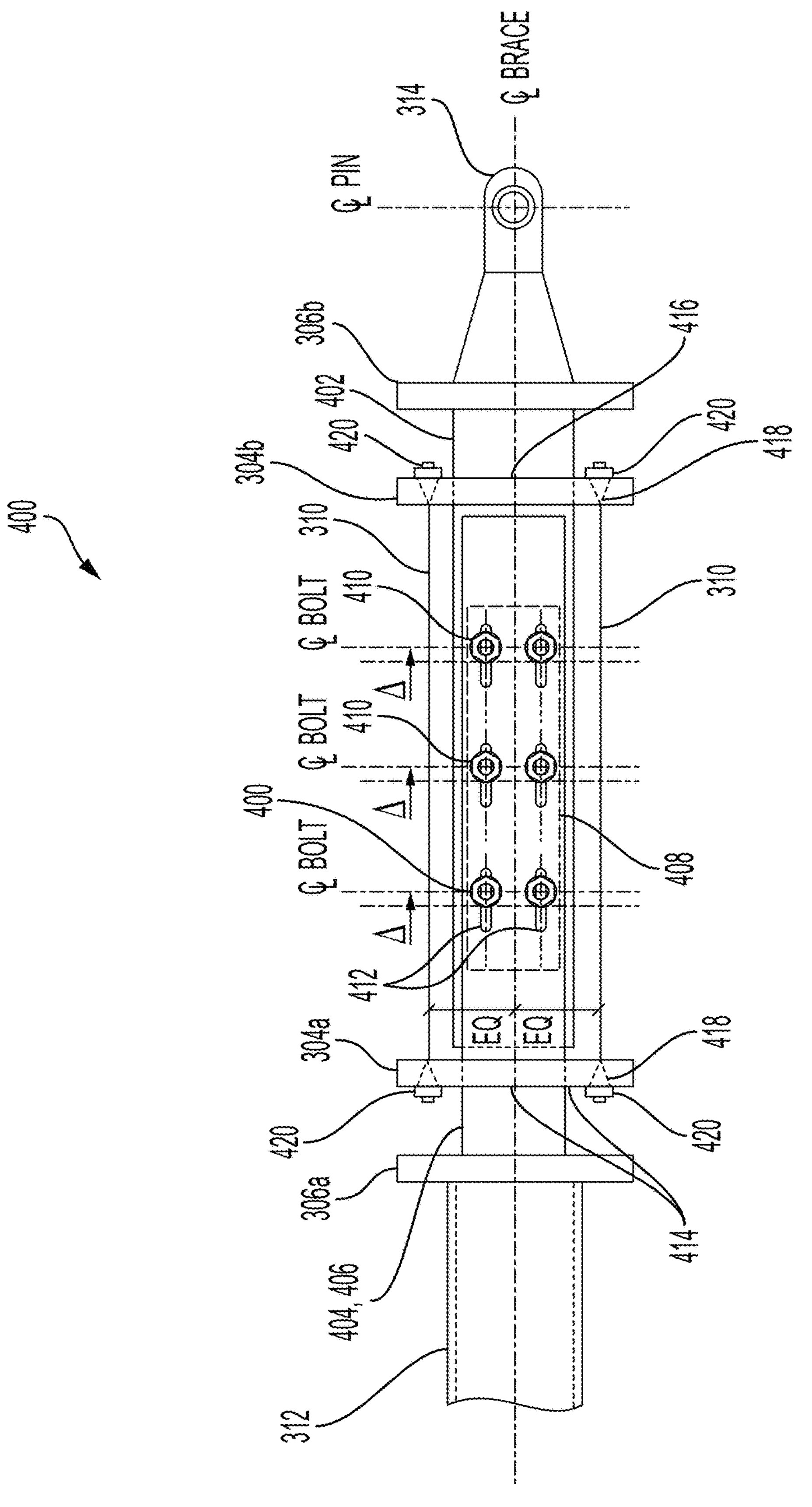
FIG. 4 shows a diagram of an embodiment of a compression-resisting joint assembly from a first view that can be used in the fuse-brace of FIG. 3.
Figure 5:
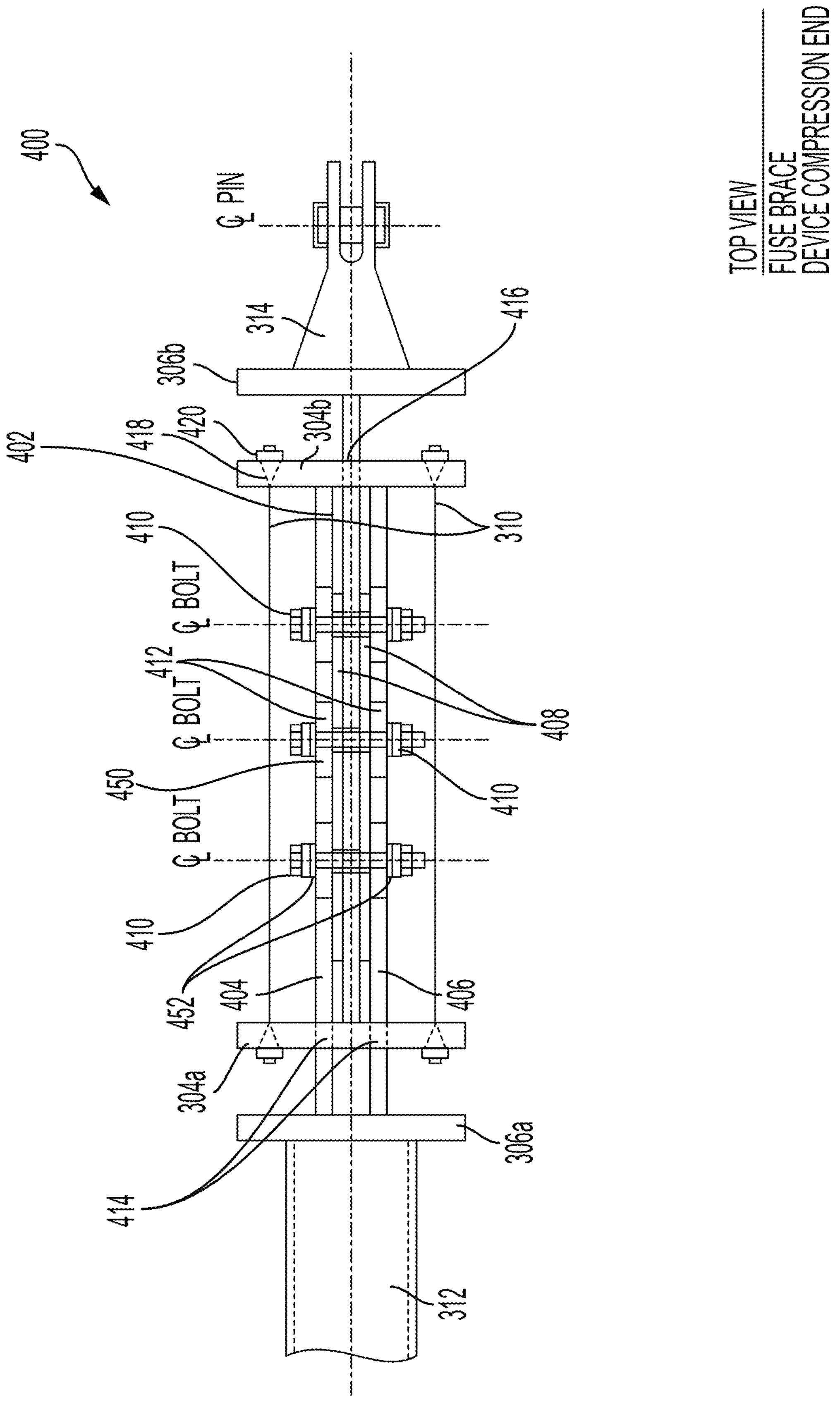
FIG. 5 shows a diagram of the compression-resisting joint assembly of FIG. 4 from a second view.

The compression-resisting joint assembly 302 also includes a first end plate 306*a* to which the first plate and the second plate are secured and from which they extend and a second end plate 306*b* to which the third plate is secured and from which it extends (see, e.g., example joint assemblies of FIGS. 4 and 5). The compression-resisting joint assembly 302 includes a restorative assembly 324 which includes elastic members 310. The elastic members 310 are placed under tension when the first, second, and third plate are displaced along the longitudinal extent or length of the third plate with respect to their original relative positions to bias the plates to return to their original positions (e.g., when exposed to a compression force from seismic or wind loading). Unless indicated otherwise, the longitudinal extent is measured along the axis of the compression-resisting joint assembly 302 (e.g., the axes between the diagonal brace member 312 and end connector 314).

The elastic members 310 may be cables, rods, springs, or another structure providing an elastic response to being deformed. In some embodiments, the elastic members 310 are made of a SMA. The elastic members 310 may be the same as the elastic members 110 of FIG. 1.

During seismic and/or wind loading, energy may be dissipated through friction in the compression-resisting joint assembly 302. For example, the bolted first, second, and third plates (in the diagonal direction of FIG. 3—see example joint assemblies of FIGS. 4-7) allow for a diagonal movement or slip of the first and second plates relative to the third plate under compression, such as during extreme seismic loads without a significant loss in the bolt clamping force. Movement of the plates may be further restricted by treating the faying (i.e., contacting) surfaces of the plate assembly 308 with a friction material (e.g., by providing a friction shim between adjacent plates). The friction developed from the clamping force within the plate assembly 308 with the friction material against the plate surfaces prevents the compression-resisting joint assembly 302 from slipping under most normal service loading conditions, such as those imposed by gravity and moderate seismic and wind events. However, under extreme seismic and/or wind loading conditions, the level of force applied to the compression-resisting joint assembly 302 exceeds the product of the coefficient of friction times the normal bolt clamping force, which causes the compression-resisting joint assembly 302 to slip along its length and/or rotate while maintaining connectivity.

During this slip due to compression, the elastic members 310 are activated to bring the plate assembly 308 back to its original position. The elastic members 310 dissipate energy while also creating a mechanism for frame recentering after the seismic or wind event. For example, the sliding of the compression-resisting joint assembly 302 in the diagonal direction of FIG. 3 and/or the rotation of the compression-resisting joint assembly 302 during seismic events provides for the transfer of shear forces and bending moment from the diagonals and beams 30 of the frame assembly 320 to its columns 31A,B. This sliding and rotation dissipates energy via "fusing" as described above. This energy dissipation reduces or eliminates potential damage to the frame assembly 320 due to seismic or wind activity. Because of the unique properties of the compression-resisting joint assembly 302, the frame assembly 320 may also be resistant to subsequent earthquakes, since the joint assembly 302 and neighboring structures remain elastic without permanent deformation. As such, the frame assembly 320 with fuse-brace 300 can resist axial forces, bending moments, and shears generated by these loads. In some embodiments, no part of the compression-resisting joint assembly 302 becomes plastic or yields when subjected to loading and during the subsequent slip or movement of the joint assembly's plates. This allows a frame assembly 320 with the fuse-brace 300 having a compression-resisting joint assembly 302 to remain in service after enduring a seismic event and still resist further seismic activity.

As described in greater detail below with the example embodiments of FIGS. 8-13 and 15A-C, the tension-resisting joint assembly 350 acts as a friction joint made up of plates, a friction material, and high strength bolts along with elastic members 310 arranged to resist tension. The tension-resisting joint assembly 350 includes a plate assembly 358 with a first plate, a second plate, and a third plate all oriented parallel to each other (e.g., along a length of the tension-resisting joint assembly 350) with the third plate positioned between the first plate and the second plate (see, e.g., example joint assemblies of FIGS. 8 and 9). The tension-resisting joint assembly 350 also includes a fuse assembly 360 with bolts (e.g., high-strength steel bolts) clamping the first, second, and third plates together. For example, as shown in the example embodiments of FIGS. 8 and 9, the third plate may have at least one hole, while the first plate and the second plate each have a respective slot aligned with the at least one hole. A bolt extends through the respective slots and the at least one hole and is torqued to clamp together the first, second, and third plate.

Figure 8:
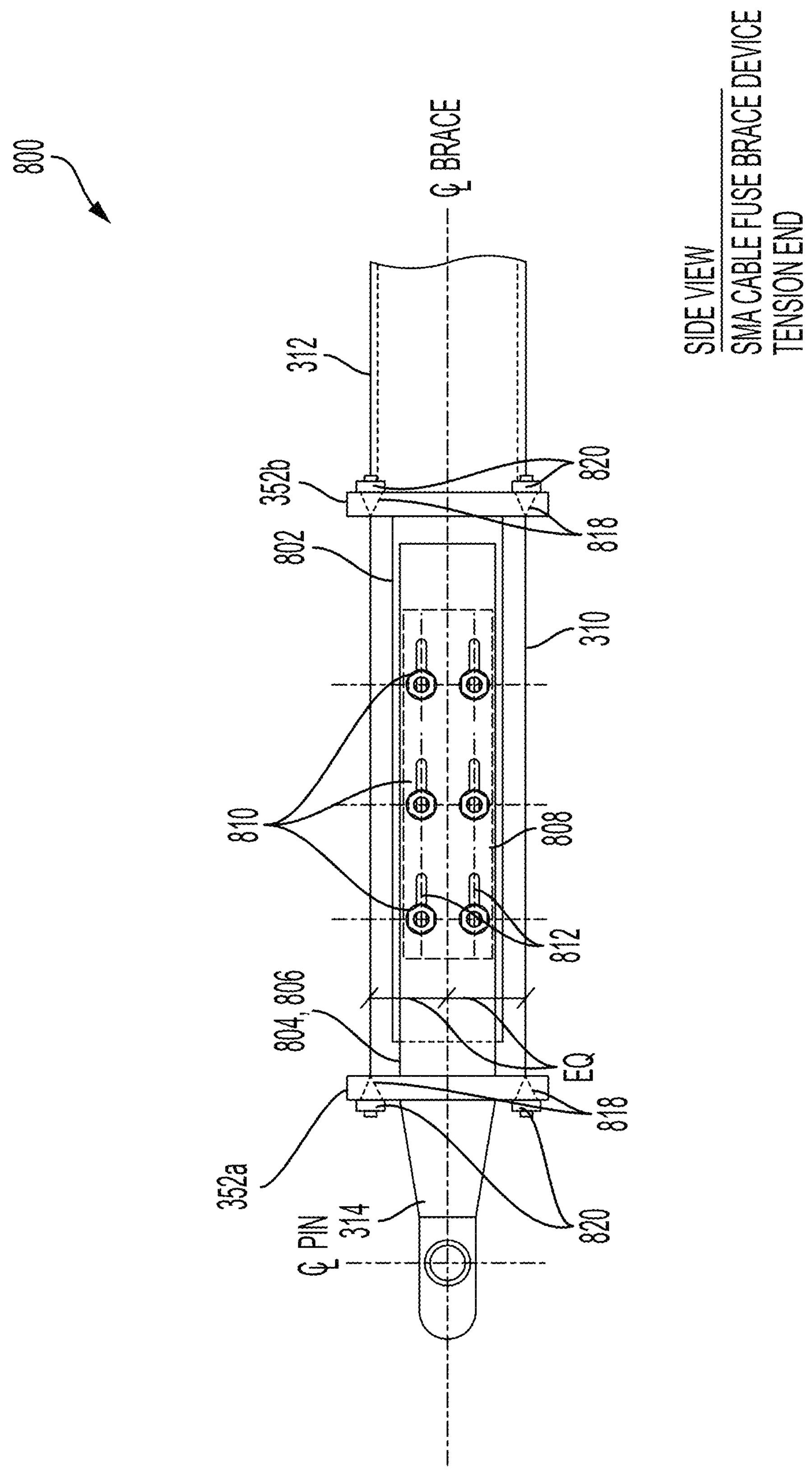
FIG. 8 shows a diagram of a tension-resisting joint assembly from a first view that can be used in the fuse-brace of FIG. 3.
Figure 9:
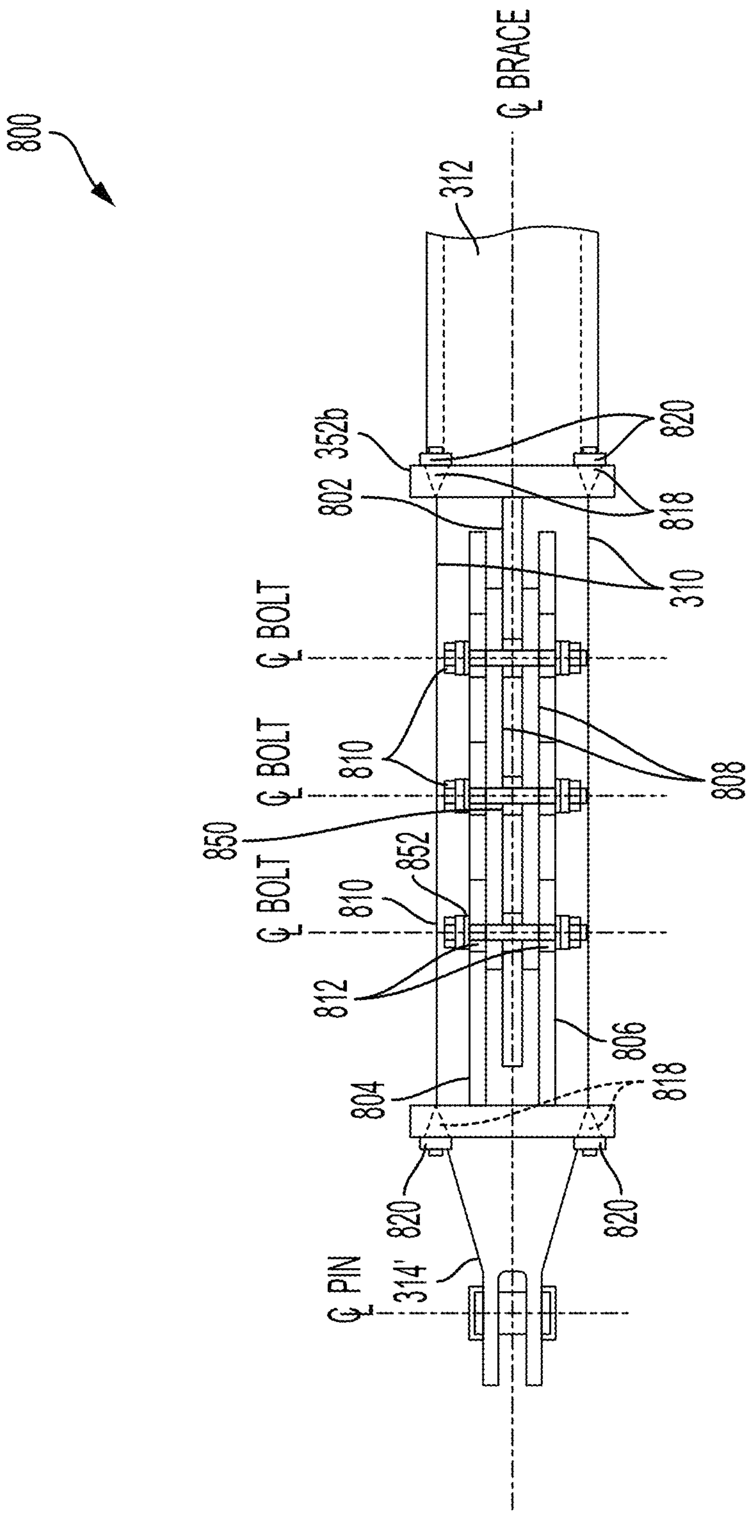
FIG. 9 shows a diagram of the tension end joint assembly of FIG. 8 from a second view.

The tension-resisting joint assembly 350 also includes a first end plate 352*a* to which the first plate and the second plate are secured and from which they extend and a second end plate 352*b* to which the third plate is secured and from which it extends (see, e.g., example joint assemblies of FIGS. 8 and 9). The tension-resisting joint assembly 350 includes a restorative assembly 362 which includes elastic members 310. The elastic members 310 are placed under tension when the first, second, and third plate are displaced along the longitudinal extent of the third plate with respect to their original relative positions to bias the plates to return to their original positions (e.g., when exposed to a tension force from seismic or wind loading). Unless indicated otherwise, the longitudinal extent is measured along the axis of the tension-resisting joint assembly 350 (e.g., the axes between the diagonal brace member 312 and end connector 314').

During seismic and/or wind loading, energy may be dissipated through friction in the tension-resisting joint assembly 350. For example, the bolted first, second, and third plates (in the diagonal direction of FIG. 3—see example joint assemblies of FIGS. 8-9) allow for a diagonal movement or slip of the first and second plates relative to the third plate under tension, such as during extreme seismic loads without a significant loss in the bolt clamping force. Movement of the plates may be further restricted by treating the faying (i.e., contacting) surfaces of the plate assembly 358 with a friction material (e.g., by providing a friction shim between adjacent plates). The friction developed from the clamping force within the plate assembly 358 with the friction material against the plate surfaces prevents the tension-resisting joint assembly 350 from slipping under most normal service loading conditions, such as those imposed by gravity and moderate seismic and wind events. However, under extreme seismic and/or wind loading conditions, the level of force applied to the tension-resisting joint assembly 350 exceeds the product of the coefficient of friction times the normal bolt clamping force, which causes the tension-resisting joint assembly 350 to slip along its length and/or rotate while maintaining connectivity.

During this slip due to tension, the elastic members 310 are activated to bring the plate assembly 358 back to its original position. The elastic members 310 dissipate energy while also creating a mechanism for frame recentering after the seismic or wind event. For example, the sliding of the tension-resisting joint assembly 350 in the diagonal direction of FIG. 3 and/or the rotation of the tension-resisting joint assembly 350 during seismic events provides for the transfer of shear forces and bending moment from the diagonals and beams 30 of the frame assembly 320 to its columns 31A,B. This sliding and rotation dissipates energy via "fusing" as described above. This energy dissipation reduces or eliminates potential damage to the frame assembly 320 due to seismic or wind activity. Because of the unique properties of the tension-resisting joint assembly 350, the frame assembly 320 may also be resistant to subsequent earthquakes, since the joint assembly 302 and neighboring structures remain elastic without permanent deformation. As such, the frame assembly 320 with fuse-brace 300 can resist axial forces, bending moments, and shears generated by these loads. In some embodiments, no part of the tension-resisting joint assembly 350 becomes plastic or yields when subjected to loading and during the subsequent slip or movement of the joint assembly's plates. This allows a frame assembly 320 with the fuse-brace 300 having a tension-resisting joint assembly 350 to remain in service after enduring a seismic event and still resist further seismic activity.

FIGS. 4 and 5 illustrate an embodiment of a joint assembly 400 which may be used as the compression-resisting joint assembly 302 of FIG. 3. FIG. 4 shows a first or side view of the joint assembly 400, and FIG. 5 shows the joint assembly 400 from a second or top view. As shown in these figures, the joint assembly 400 includes a plate assembly (e.g., corresponding to plate assembly 308 of FIG. 3) that includes a first plate 404, a second plate 406, and a third plate 402 all oriented parallel to each other. The third plate 402 is positioned between the first plate 404 and the second plate 406 (see view of FIG. 5). The first plate 404, second plate 406, and third plate 402 may be made of steel or a composite material.

The joint assembly 400 includes a fuse assembly (e.g., corresponding to fuse assembly 322 of FIG. 3) which includes holes 450 (see FIG. 5) in the third plate 402 and respective slots 412 in each of the first plate 404 and the second plate 406. Each of the slots 412 is aligned with a corresponding hole 450. Each slot 412 has a longitudinal extent parallel to the longitudinal extent of the third plate 402. A bolt 410 extends through each hole 450 and its respective slots 412. The bolts 410 are torqued to clamp together the first plate 404, the second plate 406, and the third plate 402. The level of torque may be selected to allow the joint assembly 400 to slip, as shown by the dashed lines in FIG. 4, when exposed to extreme seismic or wind loading but to remain in place under normal loading conditions. The bolts 410 may be high-strength structural bolts.

The fuse assembly may include friction shims 408 between the first plate 404 and the third plate 402 and between the second plate 406 and the third plate 402. The friction shims 408 may include an abrasion resistant steel or a synthetic brake pad material, which may be the same or similar to the material of the friction shims 208 described above. Friction shims 452 (see FIG. 5) may also be positioned between the heads of bolts 410 and corresponding washers. Friction shims 452 may be positioned between the surface of the first plate 404 and the head of the bolts 410 and between the surface of the second plate 406 and washers holding bolts 410 in place (see FIG. 5). The bolts 410 may alternatively be installed in the opposite direction in some embodiments. Friction shims 452 may be made of the same or a similar material to that of friction shims 408.

The joint assembly 400 includes the first end plate 306*a* to which the first plate 404 and the second plate 406 are secured (e.g., welded) and from which they extend (see top view of FIG. 5). The first end plate 306*a* is positioned at a first end of the joint assembly 400. The first end plate 306*a* is connected (e.g., welded) to diagonal brace member 312. The joint assembly 400 also includes the second end plate 306*b* to which the third plate 402 is secured (e.g., welded) and from which it extends (see top view of FIG. 5). The second end plate 306*b* is positioned at a second end of the joint assembly 400, which is spaced from the first end of the joint assembly 400 along a longitudinal direction of the third plate. The second end plate 306*b* is connected (e.g., welded) to the end connector 314.

The joint assembly 400 includes a restorative assembly (e.g., corresponding to the restorative assembly 324 of FIG. 3). The restorative assembly includes elastic members 310, which can be cables, springs, or the like, as described above with respect to FIG. 3.

The restorative assembly includes the first connection plate 304*a* and second connection plate 304*b*. The first connection plate 304*a* has a slot 414 through which the first plate 404 extends and a slot 414 through which the second plate 404 extends. The second connection plate 304*b* has a third slot 416 through which the third plate 406 extends. The elastic members 310 may extend through the first connection plate 304*a* and the second connection plate 304*b* (e.g., through holes 418) and are secured in place by connectors 420. Connectors 420 prevent the elastic members 310 from pulling out of the first connection plate 304*a* and the second connection plate 304*b*. The connectors 420 may be screw-on or other fasteners (e.g., made of steel, a composite, or a similar material) that can be affixed to ends of the elastic members 110 as shown. Example connectors 420 include swage connectors, bolts, or more generally pieces of material, such as steel or a composite, which fits around or connects to the elastic members 310 and holds the elastic members 310 in place. During compression experienced from seismic loading or wind loading, the joint assembly 400 may undergo compression causing the bolts 410, third plate 402, and connection plate 304*b* to move a distance (A) towards the second end plate 306*b*. When the compression is removed, the bolts 410 and connection plate 304*b* return to their original positions.

Figure 6:
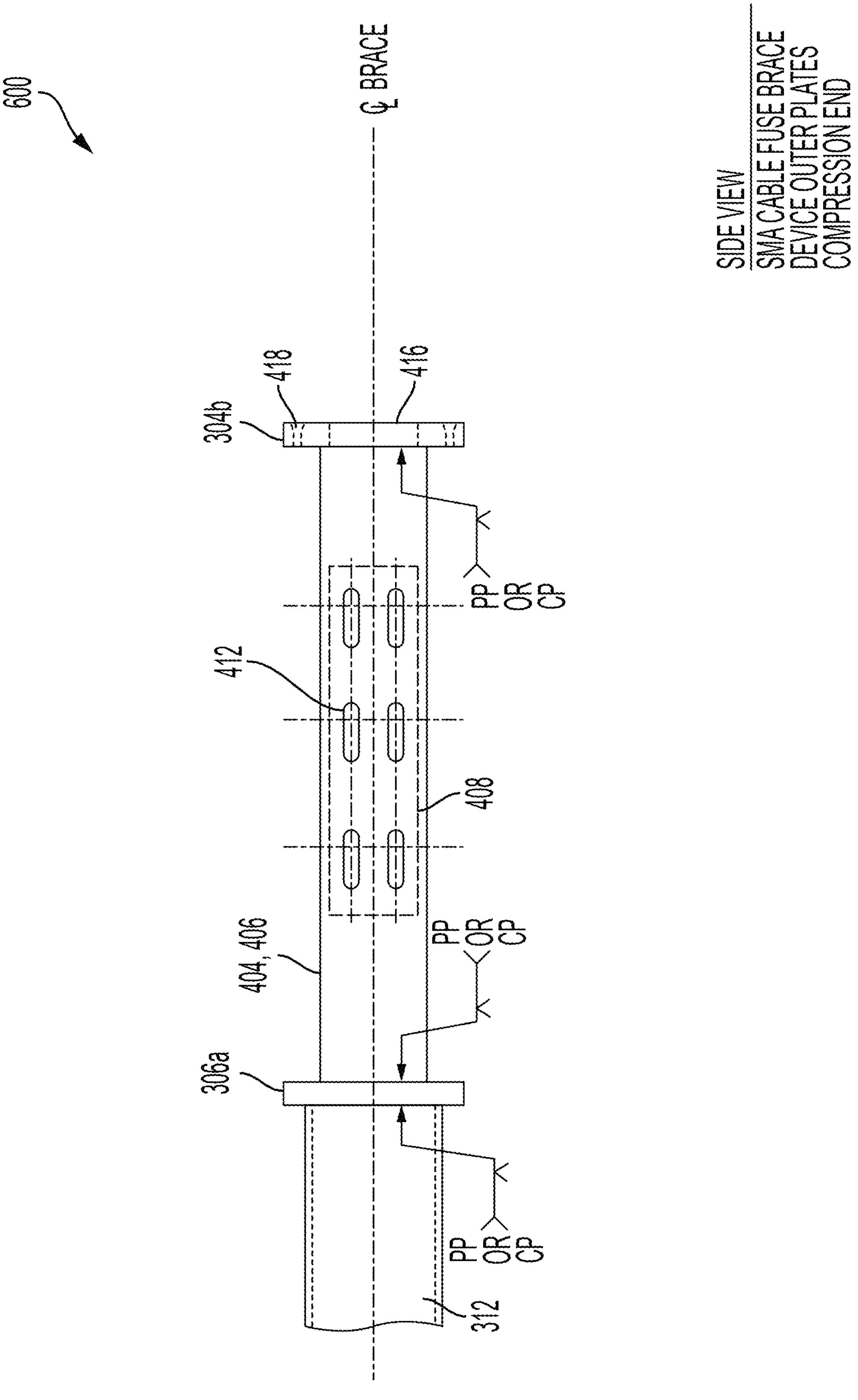
FIG. 6 shows a diagram of a first portion of the compression-resisting joint assembly of FIG. 4 that can be connected to the diagonal brace member of the fuse-brace of FIG. 3.
Figure 7:
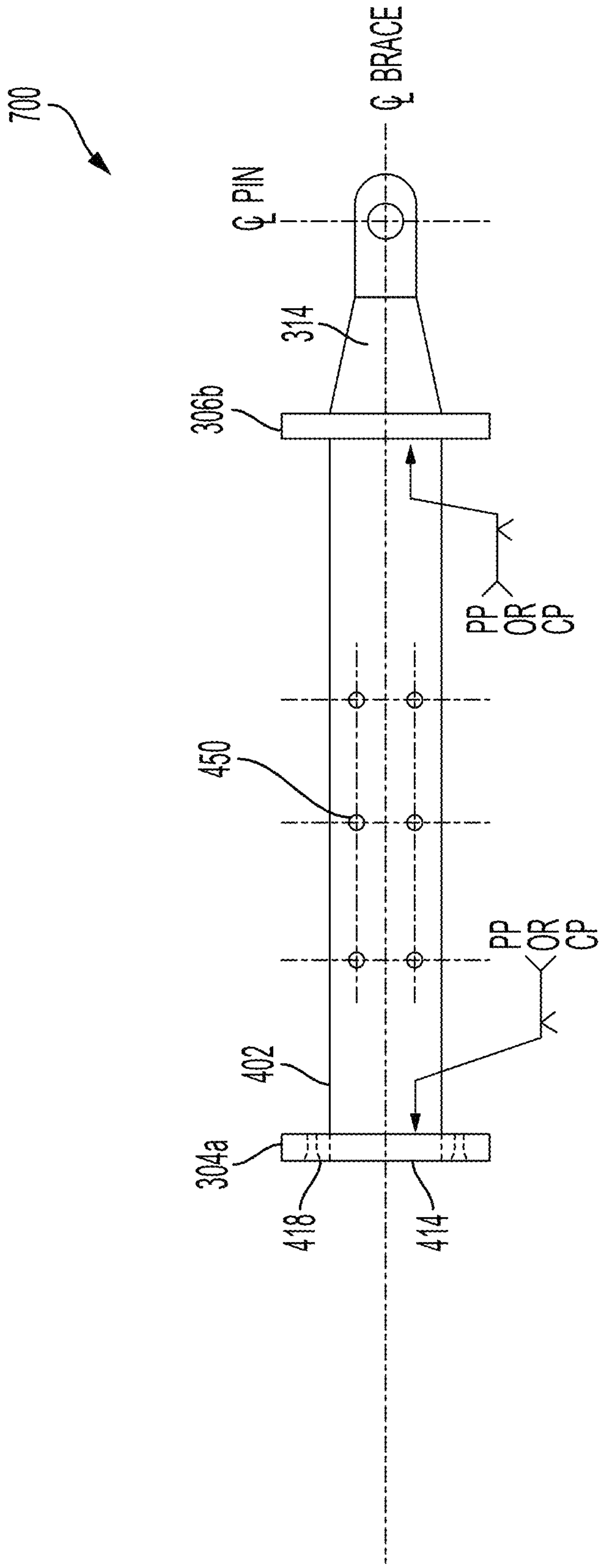
FIG. 7 shows a diagram of a second portion of the compression-resisting joint assembly of FIG. 4 that can be connected to the end connector of the fuse-brace of FIG. 3.
Figure 14A:
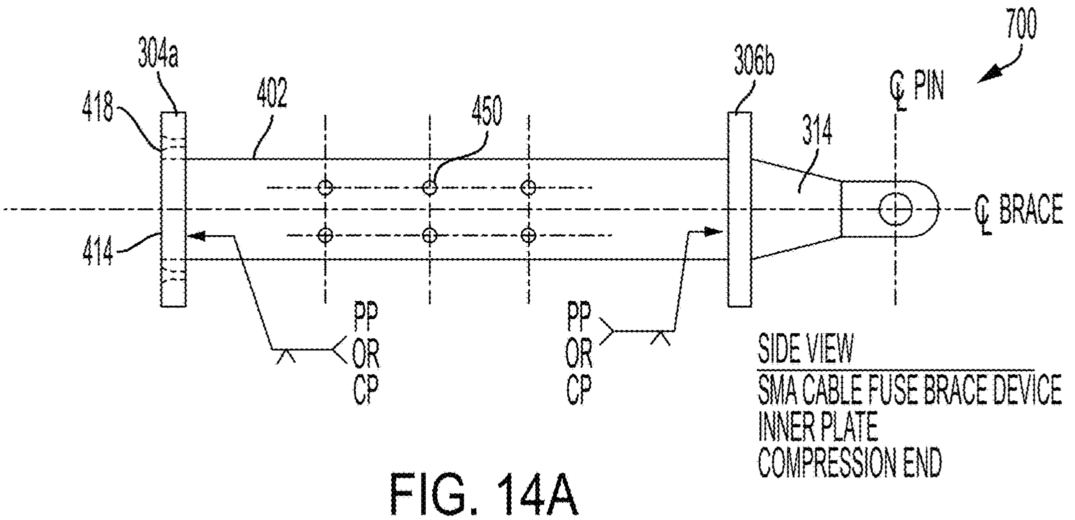
FIGS. 14A, 14B, and 14C are aligned diagrams of the components shown in FIGS. 7, 6, and 4, respectively.
Figure 14B:
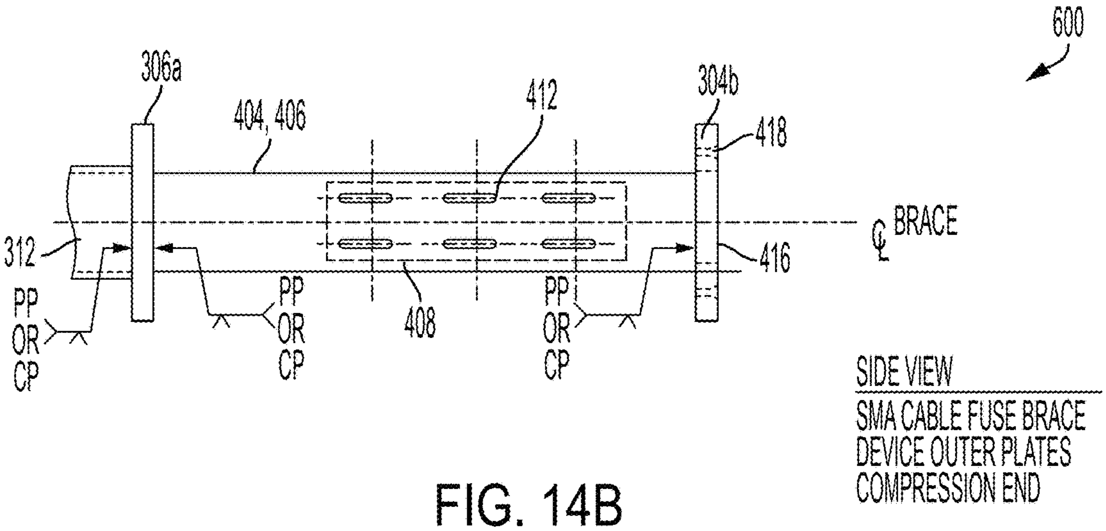
Figure 14C:
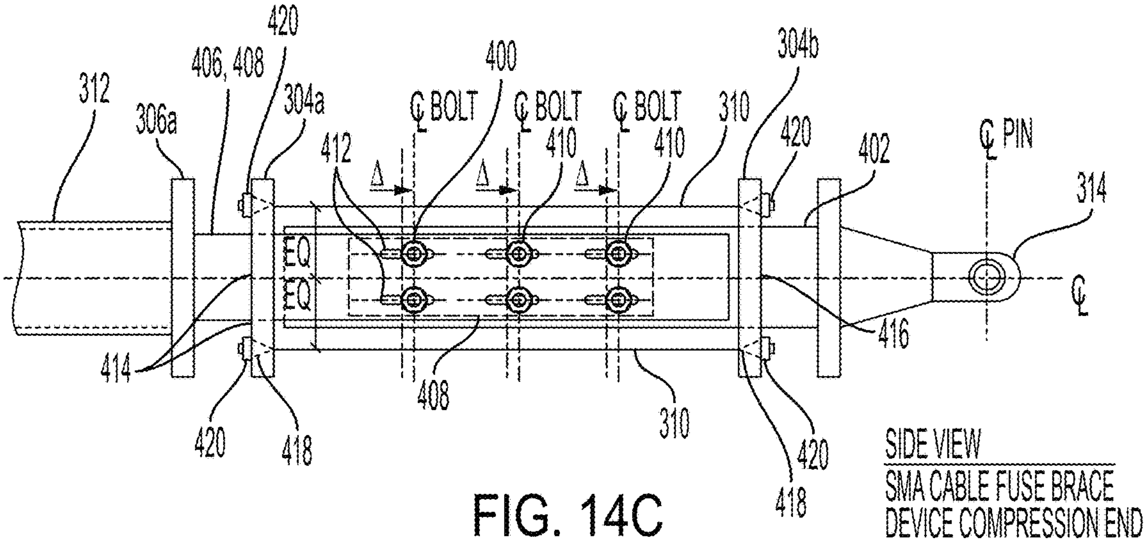

The joint assembly 400 may be constructed by combining two portions using bolts 410. FIG. 6 shows a diagram of a first portion 600 of the joint assembly 400 of FIGS. 4 and 5 that is connected to the diagonal brace member 312 of FIG. 3. The first portion 600 is connected (e.g., welded) to the diagonal brace member 312 and includes the first end plate 306*a* and second connection plate 304*b*, which are connected by the first plate 404 and the second plate 406. FIG. 7 shows a diagram of a second portion 700 of the joint assembly 400 of FIGS. 4 and 5 that is connected to the end connector 314 of FIG. 3. The second portion 700 is connected (e.g., welded) to the end connector 314 and includes the first connection plate 304*a* and second end plate 306*b*, which are connected by the third plate 402. To form the joint assembly 400 of FIGS. 4 and 5, the first portion 600 of FIG. 6 is bolted to the second portion 700 of FIG. 7, such that the third plate 202 is between the first plate 204 and third plate 206. To aid in visualizing how these components are connected, FIGS. 14A-C show the separate first portion 600 (FIG. 14A) and second portion 700 (FIG. 14B) aligned with the completed joint assembly 400 (FIG. 14C) after the first portion 600 and second portion 700 are connected.

Figure 10:
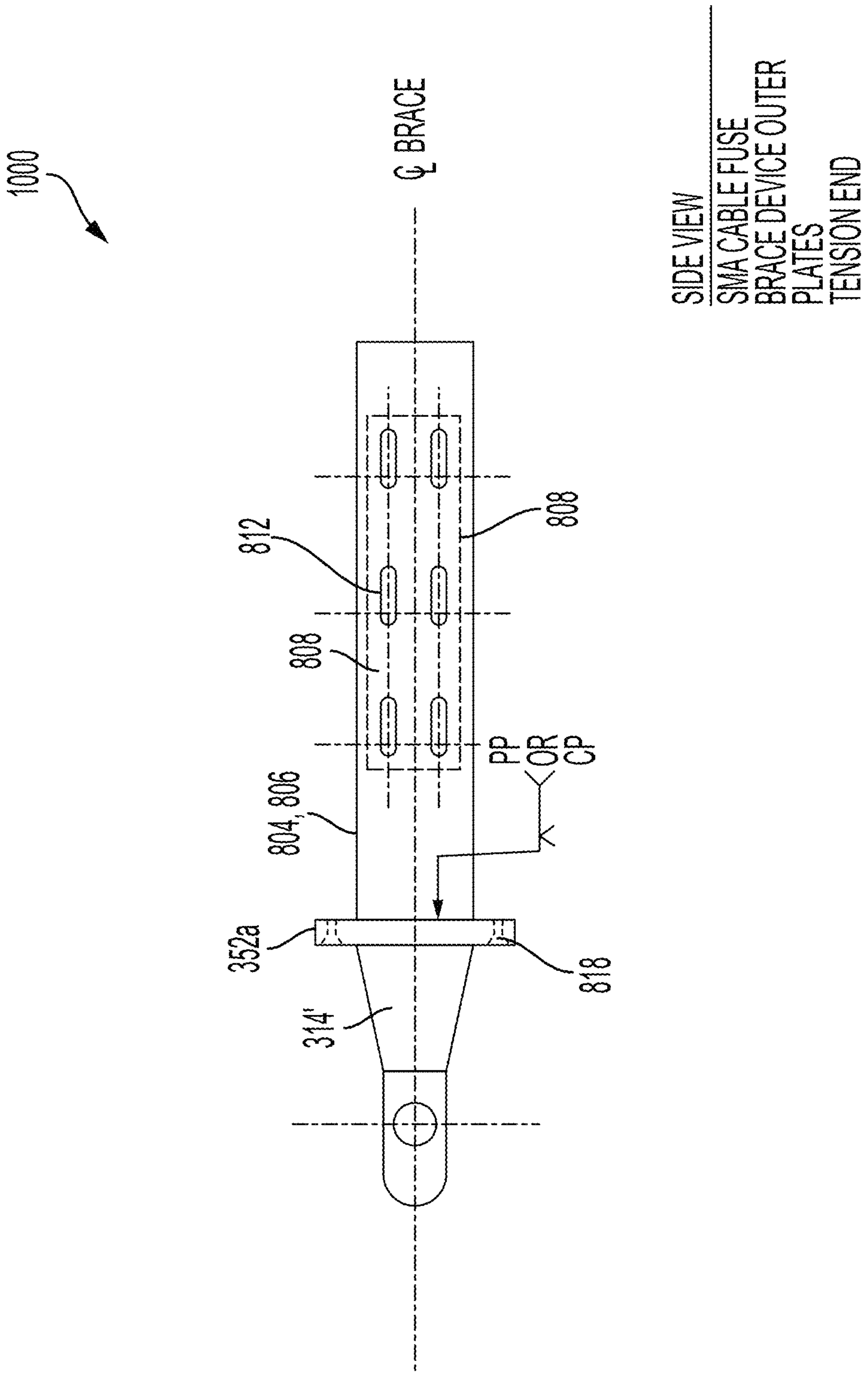
FIG. 10 shows a diagram of a first portion of the tension-resisting joint assembly of FIG. 8 that can be connected to the end connector of the fuse-brace of FIG. 3.
Figure 11:
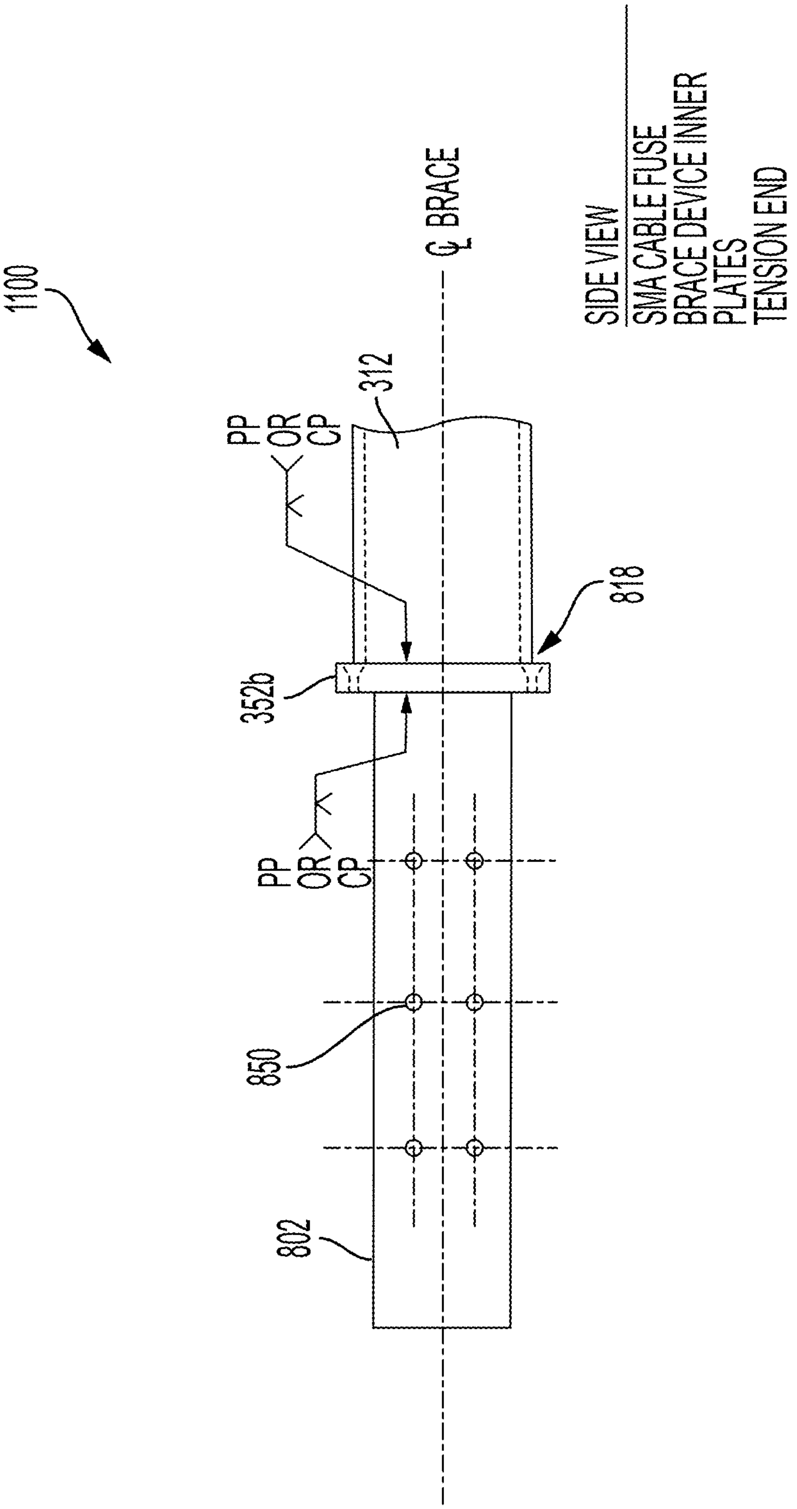
FIG. 11 shows a diagram of a second portion of the tension-resisting joint assembly of FIG. 8 that can be connected to the diagonal brace member of the fuse-brace of FIG. 3.

FIGS. 8 and 9 illustrate another embodiment of a joint assembly 800 which may be used as the joint assembly 352 of FIG. 3. FIG. 8 shows a first or side view of the joint assembly 800. FIG. 9 shows the joint assembly 800 from a second or top view. FIGS. 10 and 11 show views of embodiments of the joint assembly 800 with the end plates 106*a,b* having different shapes (square for FIG. 10 and round for FIG. 11) from a perspective directed down the longitudinal extent or length of the joint assembly 800.

FIGS. 8 and 9 illustrate an embodiment of a joint assembly 800 which may be used as the tension-resisting joint assembly 350 of FIG. 3. FIG. 8 shows a first or side view of the joint assembly 800, and FIG. 9 shows the joint assembly 800 from a second or top view. As shown in these figures, the joint assembly 800 includes a plate assembly (e.g., corresponding to plate assembly 358 of FIG. 3) that includes a first plate 804, a second plate 806, and a third plate 802 all oriented parallel to each other. The third plate 802 is positioned between the first plate 804 and the second plate 806 (see view of FIG. 9). The first plate 804, second plate 806, and third plate 802 may be made of steel or a composite material.

The joint assembly 800 includes a fuse assembly (e.g., corresponding to fuse assembly 360 of FIG. 3) which includes holes 850 (see FIG. 9) in the third plate 802 and respective slots 812 in each of the first plate 804 and the second plate 806. Each of the slots 812 is aligned with a corresponding hole 850. Each slot 812 has a longitudinal extent parallel to the longitudinal extent of the third plate 802. A bolt 810 extends through each hole 850 and its respective slots 812. The bolts 810 are torqued to clamp together the first plate 804, the second plate 806, and the third plate 802. The level of torque may be selected to allow the joint assembly 800 to slip when exposed to extreme seismic or wind loading but to remain in place under normal loading conditions. The bolts 810 may be high-strength structural bolts.

The fuse assembly may include friction shims 808 between the first plate 804 and the third plate 802 and between the second plate 806 and the third plate 802. The friction shims 808 may include an abrasion resistant steel or a synthetic brake pad material, which may be the same or similar to the material of the friction shims 208 described above. Friction shims 852 (see FIG. 9) may also be positioned between the heads of bolts 810 and corresponding washers. Friction shims 852 may be positioned between the surface of the first plate 804 and the head of the bolts 810 and between the surface of the second plate 806 and washers holding bolts 810 in place (see FIG. 9). The bolts 810 may alternatively be installed in the opposite direction in some embodiments. Friction shims 852 may be made of the same or a similar material to that of friction shims 808.

The joint assembly 800 includes the first end plate 352*a* to which the first plate 804 and the second plate 806 are secured (e.g., welded) and from which they extend (see top view of FIG. 9). The first end plate 352*a* is positioned at a first end of the joint assembly 800. The first end plate 352*a* is connected (e.g., welded) to the end connector 314'. The joint assembly 800 also includes the second end plate 352*b* to which the third plate 802 is secured (e.g., welded) and from which it extends (see top view of FIG. 9). The second end plate 352*b* is positioned at a second end of the joint assembly 800, which is spaced from the first end of the joint assembly 800 along a longitudinal direction of the third plate 802. The second end plate 352*b* is connected (e.g., welded) to the diagonal brace member 312.

The joint assembly 800 includes a restorative assembly (e.g., corresponding to the restorative assembly 362 of FIG. 3). The restorative assembly includes elastic members 310, which can be cables, springs, or the like, as described above with respect to FIG. 3. The elastic members 310 extend through the first end plate 352*a* and the second end plate 352*b* (e.g., through holes 818) and are secured in place by connectors 820. Connectors 820 prevent the elastic members 310 from pulling out of the first end plate 352*a* and the second end plate 352*b*. The connectors 820 may be the same as or similar to the connectors 420 described above. During tension experienced from seismic loading or wind loading, the joint assembly 800 may undergo tension causing the bolts 410, third plate 402, and connection plate 304*b* to move towards the first end plate 352*a*. When the tension is removed, the bolts 410 and plate 304*b* return to their original positions.

Figure 15A:
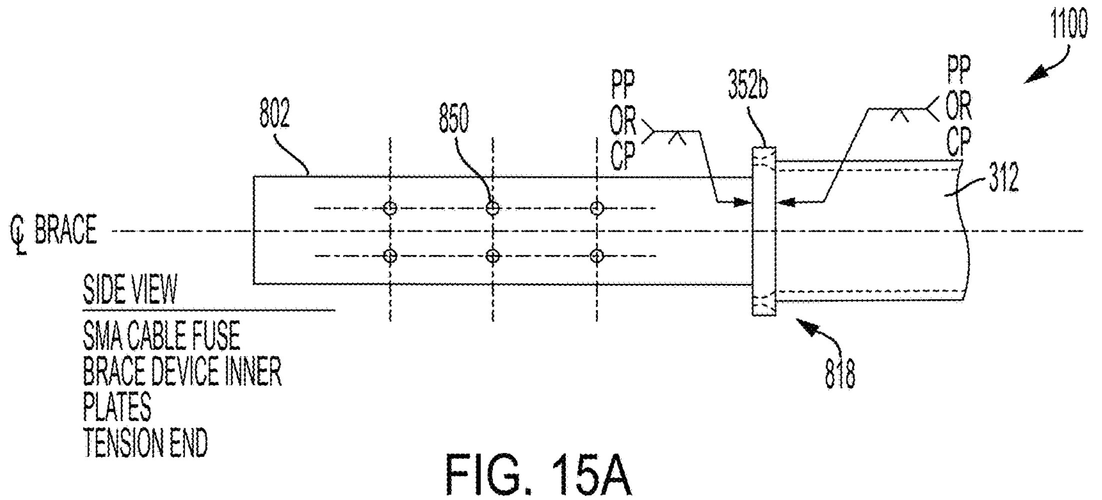
FIGS. 15A, 15B, and 15C are aligned diagrams of the components shown in FIGS. 11, 10, and 8, respectively.
Figure 15B:
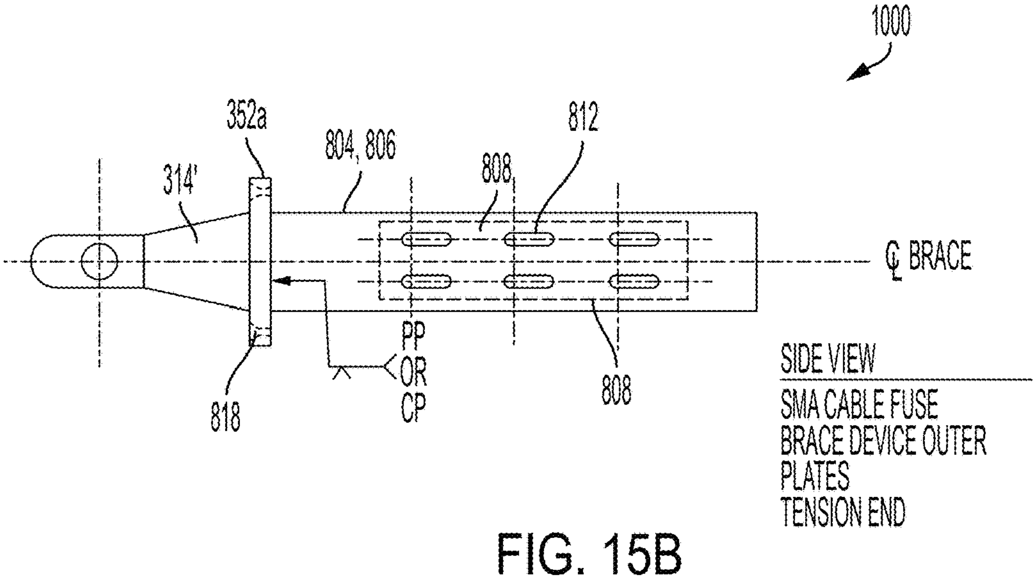
Figure 15C:
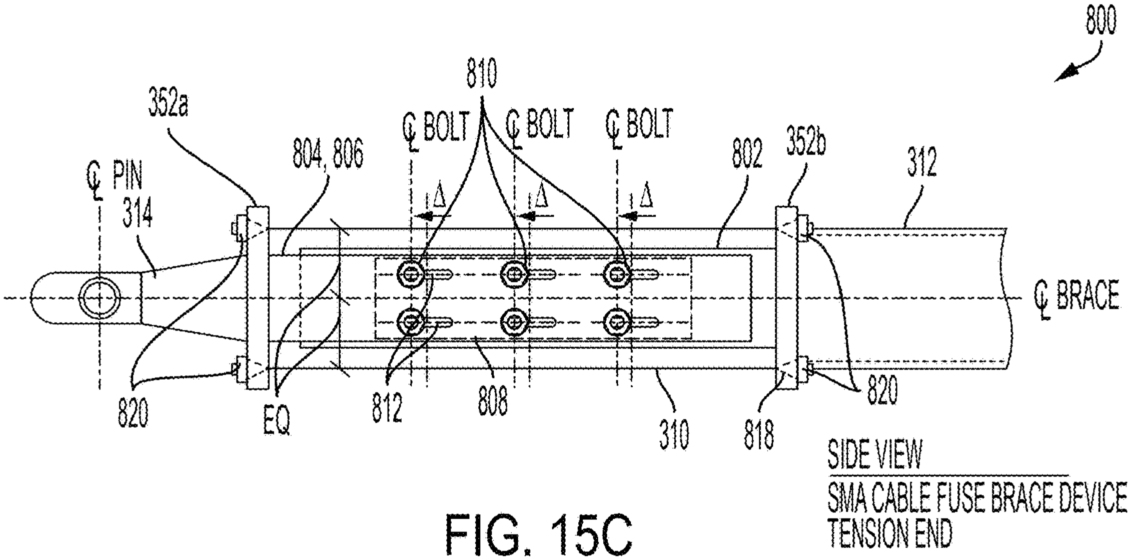

The joint assembly 800 may be constructed by combining two portions using bolts 810. FIG. 10 shows a diagram of a first portion 1000 of the joint assembly 800 of FIG. 8 that is connected to the end connector 314' of FIG. 3. The first portion 1000 is connected (e.g., welded) to the end connector 314' and includes the first end plate 352*a*, which is connected to the first plate 804 and the second plate 806. FIG. 11 shows a diagram of a second portion 1100 of the joint assembly 800 of FIG. 8 that is connected to the diagonal brace member 312 of FIG. 3. The second portion 1100 is connected (e.g., welded) to the diagonal brace member 312 and includes the second end plate 352*b*, which is connected to the third plate 802. To form the joint assembly 800 of FIGS. 8 and 9, the first portion 1000 of FIG. 10 is bolted to the second portion 1100 of FIG. 11, such that the third plate 802 is between the first plate 804 and third plate 806. To aid in visualizing how these components are connected, FIGS. 15A-C show the separate first portion 1000 (FIG. 15A) and second portion 1100 (FIG. 15B) aligned with the completed joint assembly 800 (FIG. 15C) after the first portion 1000 and second portion 1100 are connected.

Figure 13:
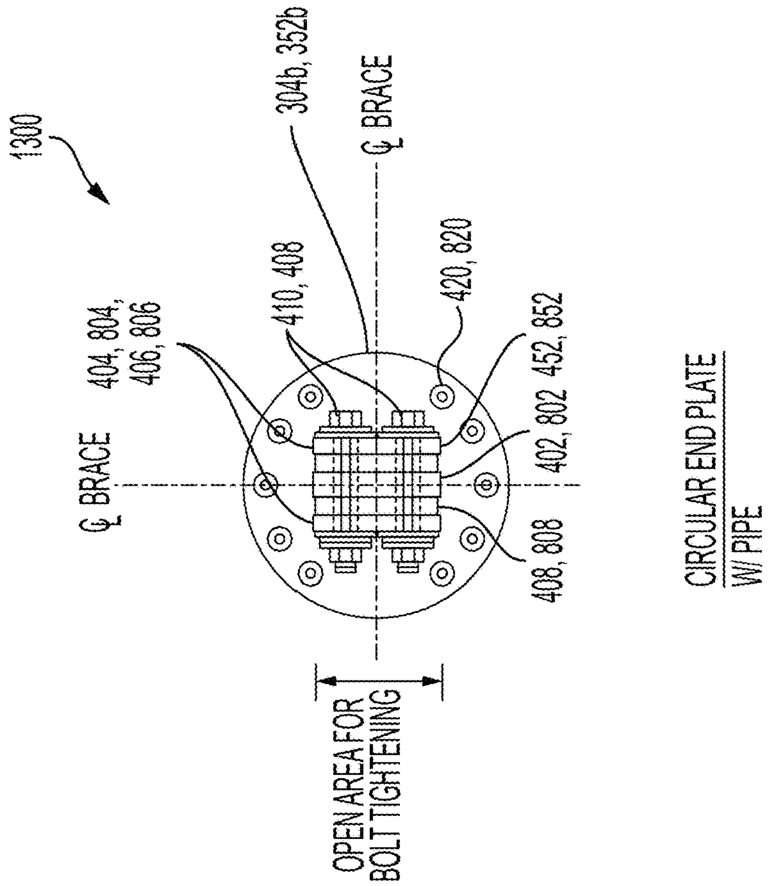
FIG. 13 shows a diagram of an embodiment of the joint assembly of FIGS. 4 and 8 with a round end plate from a third view down a longitudinal extent of the joint assembly.
Figure 12:
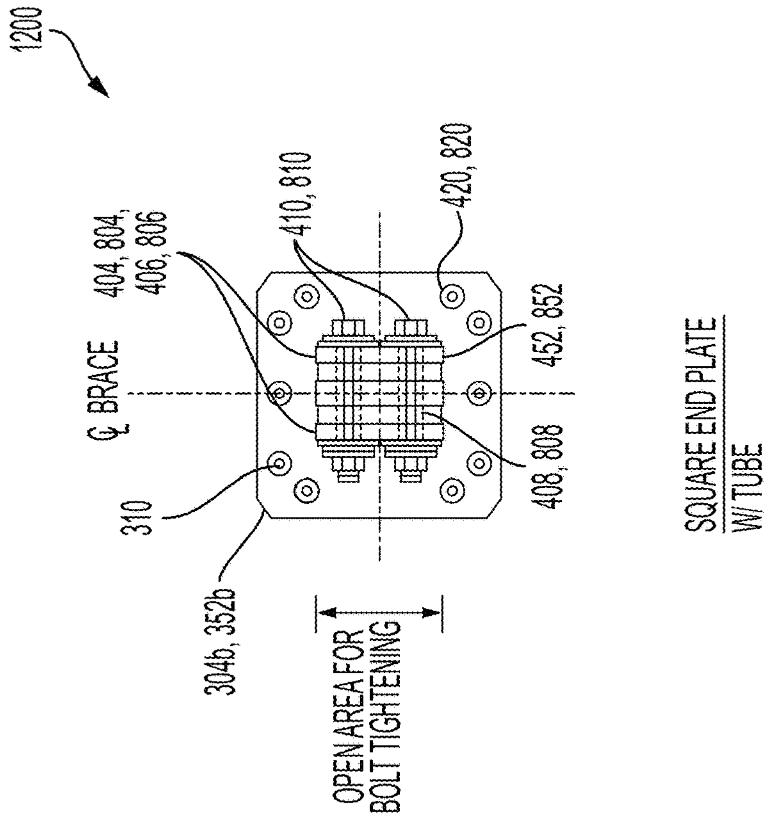
FIG. 12 shows a diagram of an embodiment of the joint assembly of FIGS. 4 and 8 with an approximately square end plate from a third view down a longitudinal extent of the joint assembly.

FIGS. 12 and 13 show views of embodiments of joint assemblies 1200 and 1300 for use as joint assemblies 400/800 with the end plates 304*b*/352*b* having different shapes (square for joint assembly 1200 of FIG. 12 and round for joint assembly 1300 of FIG. 13) from a perspective directed down the longitudinal extent or length of the joint assemblies 1200, 1300.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein. As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A joint assembly, comprising:

a plate assembly comprising a first plate, a second plate, and a third plate, wherein the first plate, the second plate, and the third plate are oriented parallel to each other with the third plate positioned between the first plate and the second plate, wherein the first plate, the second plate, and the third plate have original relative positions;

a fuse assembly comprising (a) at least one hole in the third plate, (b) a respective slot in each of the first plate and the second plate, wherein each respective slot is aligned with the at least one hole, and wherein each respective slot has a longitudinal extent parallel to a longitudinal extent of the third plate, and (c) a bolt extending through the respective slots and the at least one hole, wherein the bolt being torqued to clamp together the first plate, the second plate, and the third plate, wherein the fuse assembly has a friction force;

a first end plate to which the first plate and the second plate are secured and from which the first plate and the second plate extend, wherein the first end plate is positioned at a first end of the joint assembly;

a second end plate to which the third plate is secured and from which the third plate extends, wherein the second end plate is positioned at a second end of the joint assembly spaced from the first end of the joint assembly along a longitudinal direction of the third plate; and a restorative assembly comprising elastic members that are placed under tension when the first plate, the second plate, and the third plate are displaced along the longitudinal extent of the third plate with respect to the original relative positions of the first plate, the second plate, and the third plate to bias the first plate, the second plate, and the third plate to return to the original relative positions of the first plate, the second plate, and the third plate, wherein at least one of (a) the elastic members are pre-tensioned to a force greater than the friction force of the fuse assembly, and the plate assembly is configured to undergo a slip in which the first plate and the second plate move relative to the third plate along the longitudinal extent of the third plate, such that after the slip, the first plate, the second plate, and the third plate return to the original relative positions of the first plate, the second plate, and the third plate, or (b) the restorative assembly includes a first connection plate and a second connection plate, wherein the first connection plate having a first slot through which the first plate extends and a second slot through which the second plate extends, wherein the second connection plate having a third slot through which the third plate extends.

2. The joint assembly of claim 1, wherein the fuse assembly includes friction shims between the first plate and the third plate and between the second plate and the third plate.

3. The joint assembly of claim 2, wherein the friction shims comprise brass, steel, polytetrafluoroethylene, or bronze.

4. The joint assembly of claim 1, wherein the restorative assembly includes the first connection plate and the second connection plate, wherein the first connection plate having the first slot through which the first plate extends and the second slot through which the second plate extends, wherein the second connection plate having the third slot through which the third plate extends.

5. The joint assembly of claim 4, wherein the elastic members extend through the first connection plate and the second connection plate and have stoppers to prevent the elastic members from pulling out of the first connection plate and the second connection plate.

6. The joint assembly of claim 4, wherein the elastic members extend through the first end plate and the second end plate and include second stoppers to prevent the elastic members from pulling out of the first end plate and the second end plate.

7. The joint assembly of claim 1, wherein the elastic members comprise cables, rods, or springs.

8. The joint assembly of claim 1, wherein the elastic members comprise a shape memory alloy (SMA).

9. The joint assembly of claim 1, wherein the elastic members comprise a superelastic material.

10. The joint assembly of claim 1, wherein the first end plate is connected to a diagonal brace member, the diagonal brace member comprising a pipe, a beam, a column, or a brace.

11. The joint assembly of claim 1, wherein the plate assembly is made of steel.

12. The joint assembly of claim 1, wherein the plate assembly is made of composite material.

13. The joint assembly of claim 1, wherein the second end plate is connected to a clevis connector.

14. A structural frame comprising a diagonal brace, wherein the diagonal brace comprising:

a diagonal brace member, an end connector, and a joint assembly configured to couple the diagonal brace member to the end connector, wherein the joint assembly comprising:

a plate assembly comprising a first plate, a second plate, and a third plate, wherein the first plate, the second plate, and the third plate are oriented parallel to each other with the third plate positioned between the first plate and the second plate, wherein the first plate, the second plate, and the third plate have original relative positions;

a fuse assembly comprising (a) at least one hole in the third plate, (b) a respective slot in each of the first plate and the second plate, wherein each respective slot is aligned with the at least one hole, and wherein each respective slot has a longitudinal extent parallel to a longitudinal extent of the third plate, and (c) a bolt extending through the respective slots and the at least one hole, wherein the bolt being torqued to clamp together the first plate, the second plate, and the third plate, wherein the fuse assembly has a friction force;

a first end plate to which the first plate and the second plate are secured and from which the first plate and the second plate extend, wherein the first end plate is positioned at a first end of the joint assembly;

a second end plate to which the third plate is secured and from which the third plate extends, wherein the second end plate is positioned at a second end of the joint assembly spaced from the first end of the joint assembly along a longitudinal direction of the third plate; and a restorative assembly comprising elastic members that are placed under tension when the first plate, second plate, and third plate are displaced along the longitudinal extent of the third plate with respect to the original relative positions of the first plate, the second plate, and the third plate to bias the first plate, the second plate, and the third plate to return to the original relative positions of the first plate, the second plate, and the third plate, wherein at least one of (a) the elastic members of the joint assembly are pre-tensioned to a force greater than the friction force of the fuse assembly, and the plate assembly is configured to undergo a slip in which the first plate and the second plate move relative to the third plate along the longitudinal extent of the third plate, such that after the slip, the first plate, the second plate, and the third plate return to the original relative positions of the first plate, the second plate, and the third plate, or (b) the restorative assembly includes a first connection plate and a second connection plate, wherein the first connection plate having a first slot through which the first plate extends and a second slot through which the second plate extends, wherein the second connection plate having a third slot through which the third plate extends.

15. The structural frame of claim 14, wherein the fuse assembly includes friction shims between the first plate and the third plate and between the second plate and the third plate.

16. The structural frame of claim 14, wherein the restorative assembly includes the first connection plate and the second connection plate, wherein the first connection plate having the first slot through which the first plate extends and the second slot through which the second plate extends, wherein the second connection plate having the third slot through which the third plate extends.

17. The structural frame of claim 16, wherein the elastic members extend through the first connection plate and the second connection plate and have stoppers to prevent the elastic members from pulling out of the first connection plate and the second connection plate.

18. The structural frame of claim 16, wherein the elastic members extend through the first end plate and the second end plate and include second stoppers to prevent the elastic members from pulling out of the first end plate and the second end plate.

19. The structural frame of claim 14, wherein the elastic members comprise cables, rods, or springs.

20. The structural frame of claim 14, wherein the elastic members comprise a shape memory alloy (SMA).

* * * * *